US006784360B2

(12) United States Patent
Nakajima et al.

(10) Patent No.: US 6,784,360 B2
(45) Date of Patent: Aug. 31, 2004

(54) PHOTOVOLTAIC MODULE, SOLAR-POWER GENERATING APPARATUS, A SUPPORT MEMBER FOR SUPPORTING PHOTOVOLTAIC MODULES, AND METHOD OF INSTALLING A SOLAR-POWER GENERATING APPARATUS

(75) Inventors: Takeharu Nakajima, Settsu (JP); Kazunari Iwamoto, Koga (JP); Haruhiko Ito, Sakai (JP); Ichiro Nakajima, Kitakaturagi-gun (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/437,049

(22) Filed: May 14, 2003

(65) Prior Publication Data

US 2003/0201009 A1 Oct. 30, 2003

Related U.S. Application Data

(63) Continuation of application No. PCT/JP01/08015, filed on Sep. 14, 2001.

(30) Foreign Application Priority Data

Nov. 16, 2000 (JP) ....................................... 2000-349964
Nov. 16, 2000 (JP) ....................................... 2000-349965
Nov. 16, 2000 (JP) ....................................... 2000-349966
Nov. 16, 2000 (JP) ....................................... 2000-349967

(51) Int. Cl.⁷ ........................ H01L 31/042; E04D 13/18

(52) U.S. Cl. .................. 136/251; 136/244; 438/64; 438/66; 52/173.3; 257/433

(58) Field of Search ................. 136/251, 244; 438/64, 66; 52/173.3; 257/433

(56) References Cited

FOREIGN PATENT DOCUMENTS

| EP | 905795 A2 | * | 3/1999 |
|---|---|---|---|
| JP | 07-224506 | | 8/1995 |
| JP | 08-003023 | | 1/1996 |
| JP | 9-96071 A | * | 4/1997 |
| JP | 09-096071 | | 4/1997 |
| JP | 09-217470 | | 8/1997 |
| JP | 9-250219 A | * | 9/1997 |
| JP | 10-176403 A | * | 6/1998 |
| JP | 11-062145 | | 3/1999 |
| JP | 11-159071 | | 6/1999 |
| JP | 2000-96784 A | * | 4/2000 |
| JP | 2001-49816 | * | 2/2001 |

* cited by examiner

*Primary Examiner*—Alan Diamond
(74) *Attorney, Agent, or Firm*—Hogan & Hartson LLP

(57) ABSTRACT

Herein described is a photovoltaic module (30) that comprises a rectangular module body (61) and a frame (60) secured to the sides of the body. The frame is composed of an upper bar (63), a lower bar (64) and a pair of side bars (65 and 66). The upper bar (63) has an insertion projection (71) projecting from a part which is middle in thickness direction of the upper bar. The projection (71) is thinner than the upper bar (63).

20 Claims, 26 Drawing Sheets

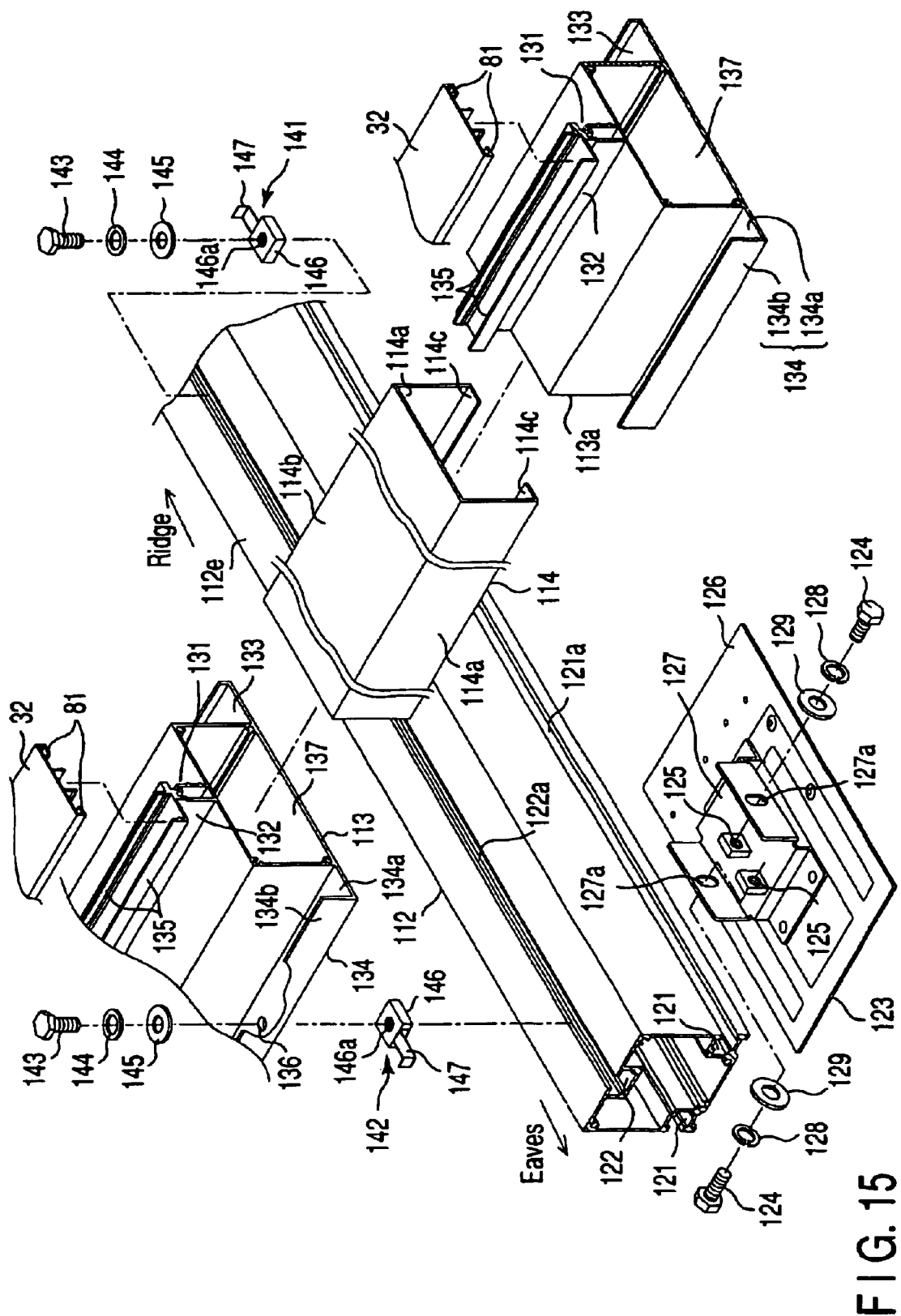
F I G. 15

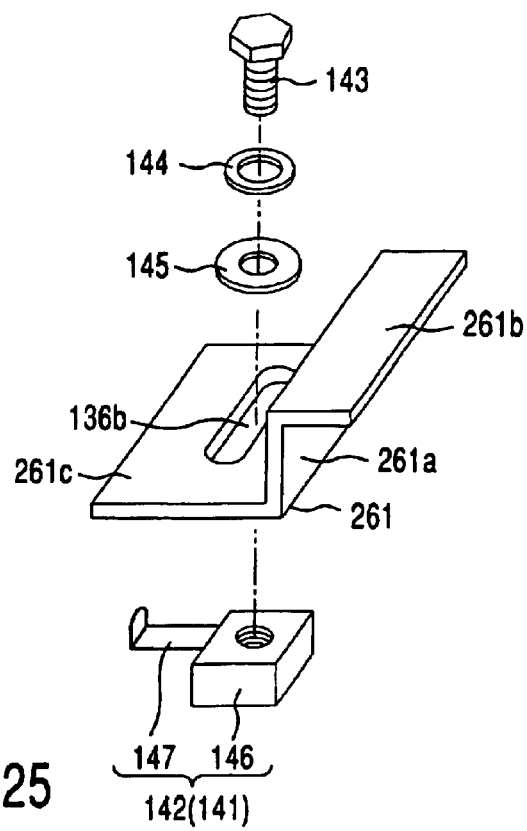
F I G. 25
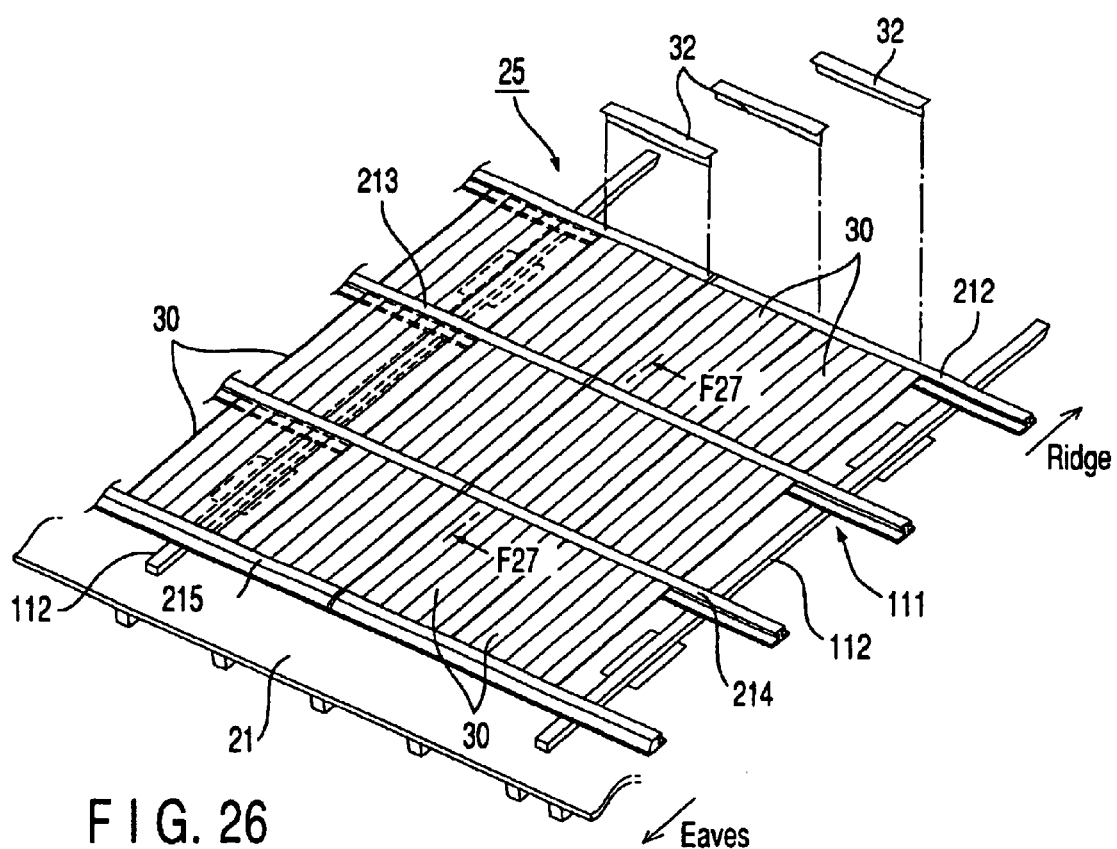
F I G. 26

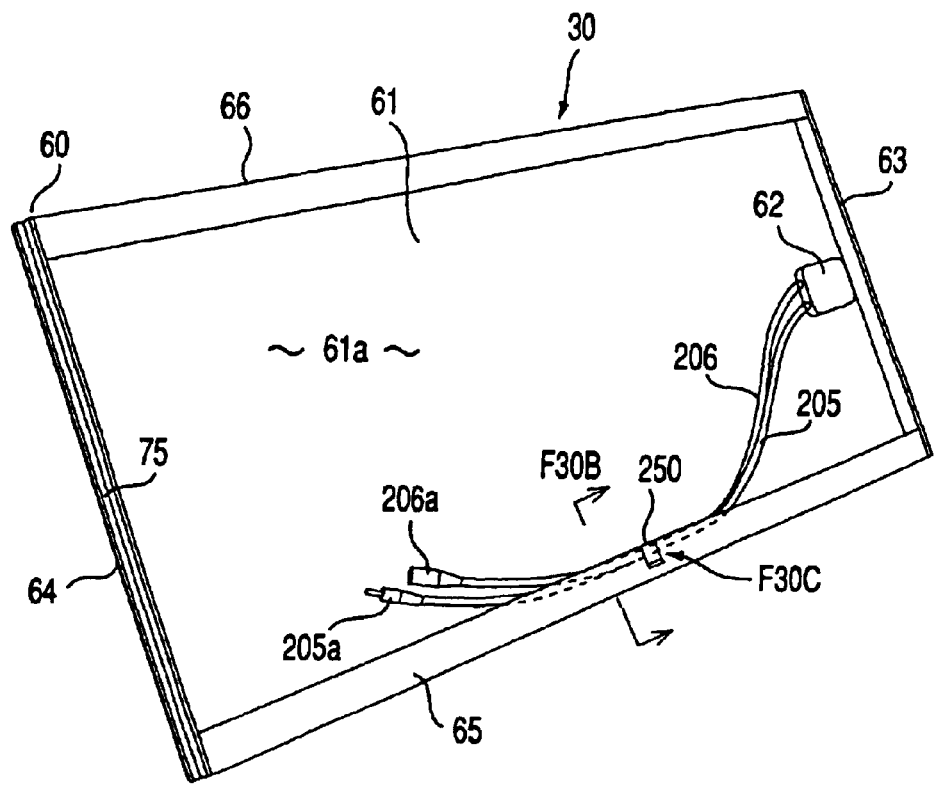
FIG. 30A
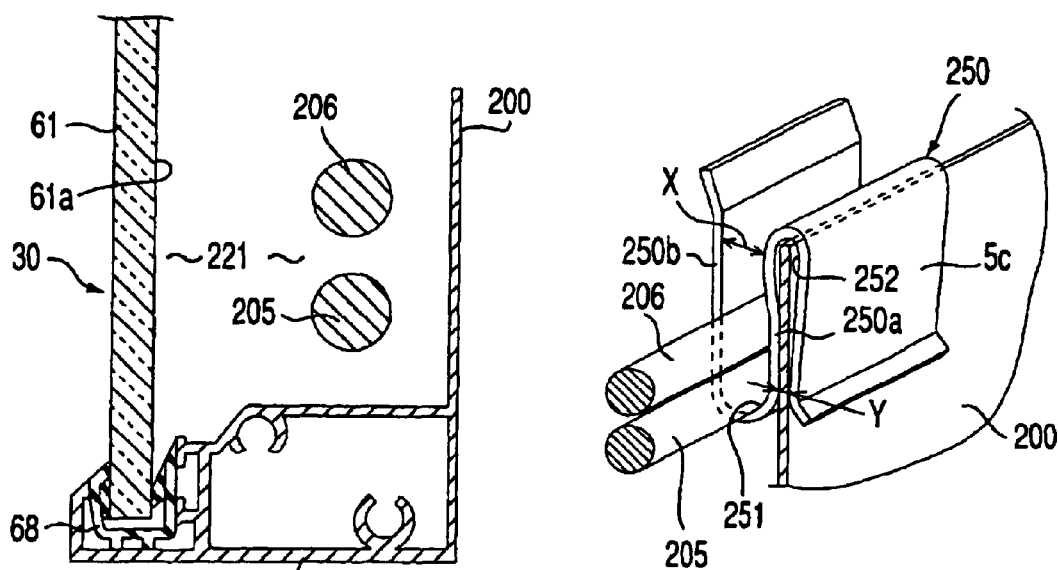
FIG. 30B
FIG. 30C

PHOTOVOLTAIC MODULE, SOLAR-POWER GENERATING APPARATUS, A SUPPORT MEMBER FOR SUPPORTING PHOTOVOLTAIC MODULES, AND METHOD OF INSTALLING A SOLAR-POWER GENERATING APPARATUS

CROSS-REFERENCE TO RELATED APPLICATIONS

This is a Continuation Application of PCT Application No. PCT/JP01/08015, filed Sep. 14, 2001, which was not published under PCT Article 21(2) in English.

This application is based upon and claims the benefit of priority from the prior Japanese Patent Applications No. 2000-349964, filed Nov. 16, 2000; No. 2000-349965, filed Nov. 16, 2000; No. 2000-349966, filed Nov. 16, 2000; and No. 2000-349967, filed Nov. 16, 2000, the entire contents of all of which are incorporated herein by reference.

BACKGROUND OF THE INVENTION

1. Field of the Invention

The present invention relates to a photovoltaic module that comprises a module body and a frame fitted on the periphery of the module body, a solar-power generating apparatus comprising photovoltaic modules arranged on the roof of a building, a support member for supporting photovoltaic modules, and a method of installing a solar-power generating apparatus.

2. Description of the Related Art

Solar-power generating apparatuses are installed on the roofs of buildings. A solar-power generating apparatus comprise photovoltaic modules laid on a rail-like support member that is secured on the roof of a building.

Japanese UM Appln. KOKAI Publication No. 8-3023 discloses the technique of installing a solar-power generating apparatus, without laying photovoltaic modules on support members that are laid on the ground.

These support members comprise an upper support and a lower support. The upper support has a groove that opens downwards and slantwise. The lower support lies below the upper support and has a groove that opens upwards and slantwise. Photovoltaic modules, each having no frame part attached to the periphery, are secured to the upper and lower supports, partly fitted in and extending between both supports.

The photovoltaic modules are secured in the following method. First, each photovoltaic module is moved up from below and slantwise, until its upper edge is inserted into the grooves of the upper support. Then, the photovoltaic module is rotated, in its entirety, around the center of the upper support, approaching and opposing the groove of the lower support. Next, the whole photovoltaic module is moved downward and slantwise, with its upper edge kept inserted in the groove of the upper support. The whole lower edge of the module is thereby inserted into the groove of the lower support. Thus, the photovoltaic module is secured to both the upper support and the lower support.

In the prior-art method, the photovoltaic module is moved upward and slantwise to have its upper edge inserted into the groove of the upper support. Hence, the upper edge of the photovoltaic module is likely to slide in acute friction. Since the upper edge of the module is relatively thick, it may abut on the rim of the groove of the upper support as it is inserted into the groove. For the same reason, the module can be inclined but at a small angle, to have its upper edge inserted into the groove of the upper support. Consequently, it is hard to achieve the insertion. The photovoltaic module cannot be secured to the support member with high efficiency by the method described above.

The present invention has been made to provide a photovoltaic module that can easily be secured to an upper support and a lower support that lies slantwise below the upper support, a solar-power generating apparatus that comprises such modules, a support member for supporting such modules, and a method of installing a solar-power generating apparatus on the roof of a building.

BRIEF SUMMARY OF THE INVENTION

A photovoltaic module according to this invention comprises a rectangular module body and a frame secured to the sides of the module body. The frame is composed of an upper bar, a lower bar and a pair of side bars. The upper bar has an insertion projection protruding from a part of the upper bar, which is middle in the thickness direction of the upper bar.

In the photovoltaic module according to the invention, the upper bar of the frame will not slide in acute friction in the down-open groove of an upper support member, even if it abuts on the bottom of the down-open groove of the upper support member. Further, the upper bar can be inserted into the down-open groove of the upper support member, at a large insertion angle. This makes it easy to insert the upper bar into the down-open groove. The photovoltaic module according to the invention can therefore be laid easily between the upper support member and the lower support member arranged below the upper support member.

A solar-power generating apparatus according to this invention comprises an upper support member, a lower support member, and photovoltaic modules. The upper and lower bars are secured on the roof of a building and spaced apart in the direction the roof slopes. The photovoltaic modules are laid between the upper and lower support members. Each module comprises a rectangular module body and a frame secured to the sides of the module body. The frame is composed of an upper bar, a lower bar and a pair of side bars. The upper bar has an insertion projection protruding from a part of the upper bar, which is middle in the thickness direction of the upper bar.

In the solar-power generating apparatus according to this invention, the upper bar of the frame of each photovoltaic module will not slide in acute friction in the down-open groove of an upper support member, even if it abuts on the bottom of the down-open groove of the upper support member. Moreover, the upper bar can be inserted into the down-open groove at a large angle. This facilitates the insertion of the upper bar into the down-open groove. Thus, the photovoltaic modules can be easily laid between the super support member and the lower support member, both secured on the roof, in the solar-power generating apparatus according to the present invention.

A support member according to this invention has a down-open groove opening downwards and slantwise and an up-open groove opening upwards and slantwise, which are positioned in back-to-back relation.

The support member of this invention can support a photovoltaic module, holding the upper bar of the module in the down-open groove or holding the lower bar of the module in the up-open groove. The support member can be effectively used to lay photovoltaic modules on the roof.

A method of installing a solar-power generating apparatus, according to the present invention, comprises the steps of: securing an upper support member and a lower support member on the roof of a building; inserting the insertion projection protruding from the upper bar of a photovoltaic module, from below and slantwise, into the down-open groove of the upper support member; rotating the photovoltaic module around the upper bar, thereby moving the lower bar of the module toward the lower support member and causing the lower bar to oppose the up-open groove of the lower support member; moving the photovoltaic module downwards and slantwise, thereby inserting the lower bar into the up-open groove; and securing holding members to the upper support member and lower support member, thereby holding the upper bar and the lower bar from above, respectively.

With the method of method of installing a solar-power generating apparatus, according to this invention, it is easy to lay photovoltaic modules between the upper and lower support members secured on the roof.

A solar-power generating apparatus according to the invention comprises a plurality of support bases and a plurality of support members laid on the support bases and crossing them, each having connection holes. Each support base has an upper wall, an opening made in the upper wall, and a groove provided inside the opening and being broader, at the bottom, than the opening. The apparatus has bolt-holding bodies, each having at least one screw hole, shaped not to rotate in the groove, and provided movably in the grooves to pass under the support members. Bolts are driven into the screw holes through the connection holes, thus coupling the support members to the support bases.

In the solar-power generating apparatus, the bolts can be driven from above and tightened to couple the support members to the support bases. Further, the bolt-holding bodies can be moved beneath the support members to the positions where the support members are coupled to the support bases. This enhances the efficiency of coupling the support members to the support bases.

BRIEF DESCRIPTION OF THE SEVERAL VIEWS OF THE DRAWING

FIG. 15 is a perspective view of the support device of the solar-power generating apparatus of FIG. 14, illustrating some parts separated from other parts of the support device;

FIG. 16A;

FIG. 25 is an exploded view depicting the relation between a bolt, a support-holding member, a bolt receptacle and the like, all used in the support device of the solar-power generating apparatus according to the sixth embodiment;

FIG. 26 is a perspective view of a solar-power generating apparatus according to a seventh embodiment of the invention, showing the roof of a building, too;

FIG. 30A is a perspective view showing one of the photovoltaic modules used in the solar-power generating apparatus of FIG. 30, illustrating the back of the photovoltaic module;

FIG. 30B is a cross-sectional view taken along line F30B—F30B shown in FIG. 30A;

FIG. 30C is a magnified, cross-sectional view showing part F30C of FIG. 26; and

DETAILED DESCRIPTION OF THE INVENTION

The first embodiment of the present invention will be described, with reference to FIGS. 1 to 6.

Figure 1:
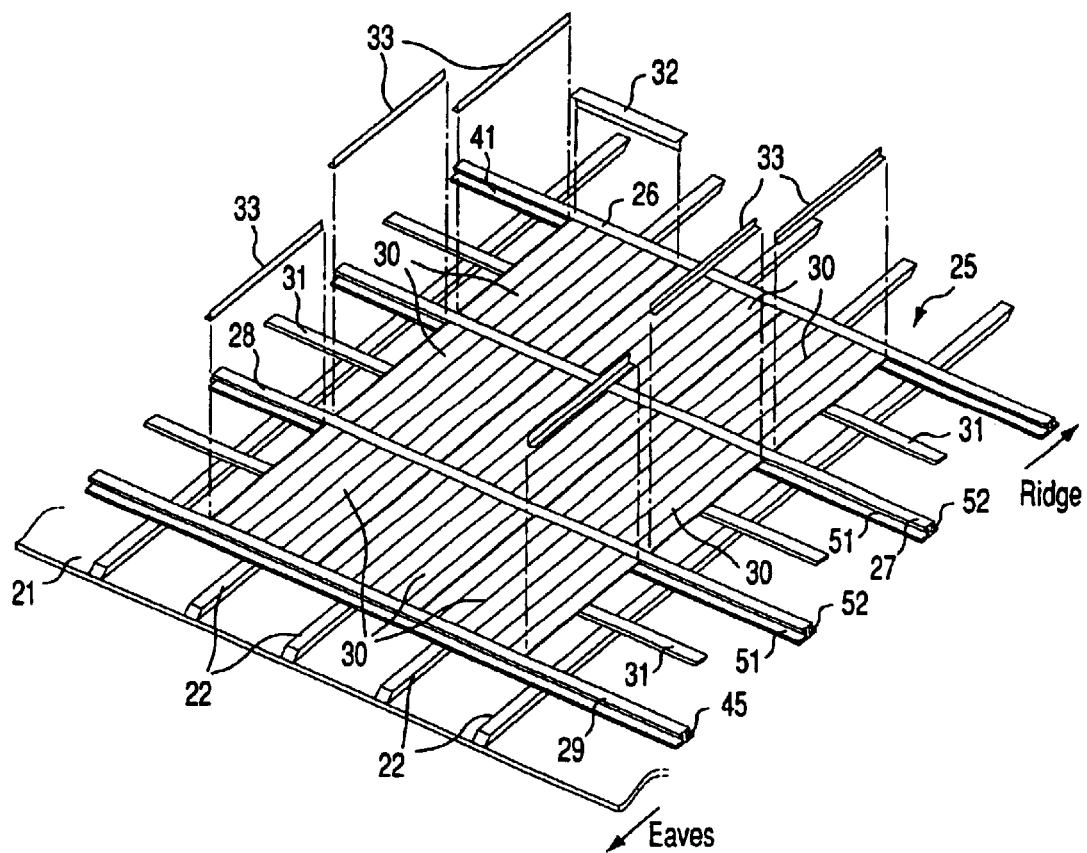
FIG. 1 is a perspective view showing a solar-power generating apparatus according to a first embodiment of the invention, and also depicting the roof of a building.
Figure 2:
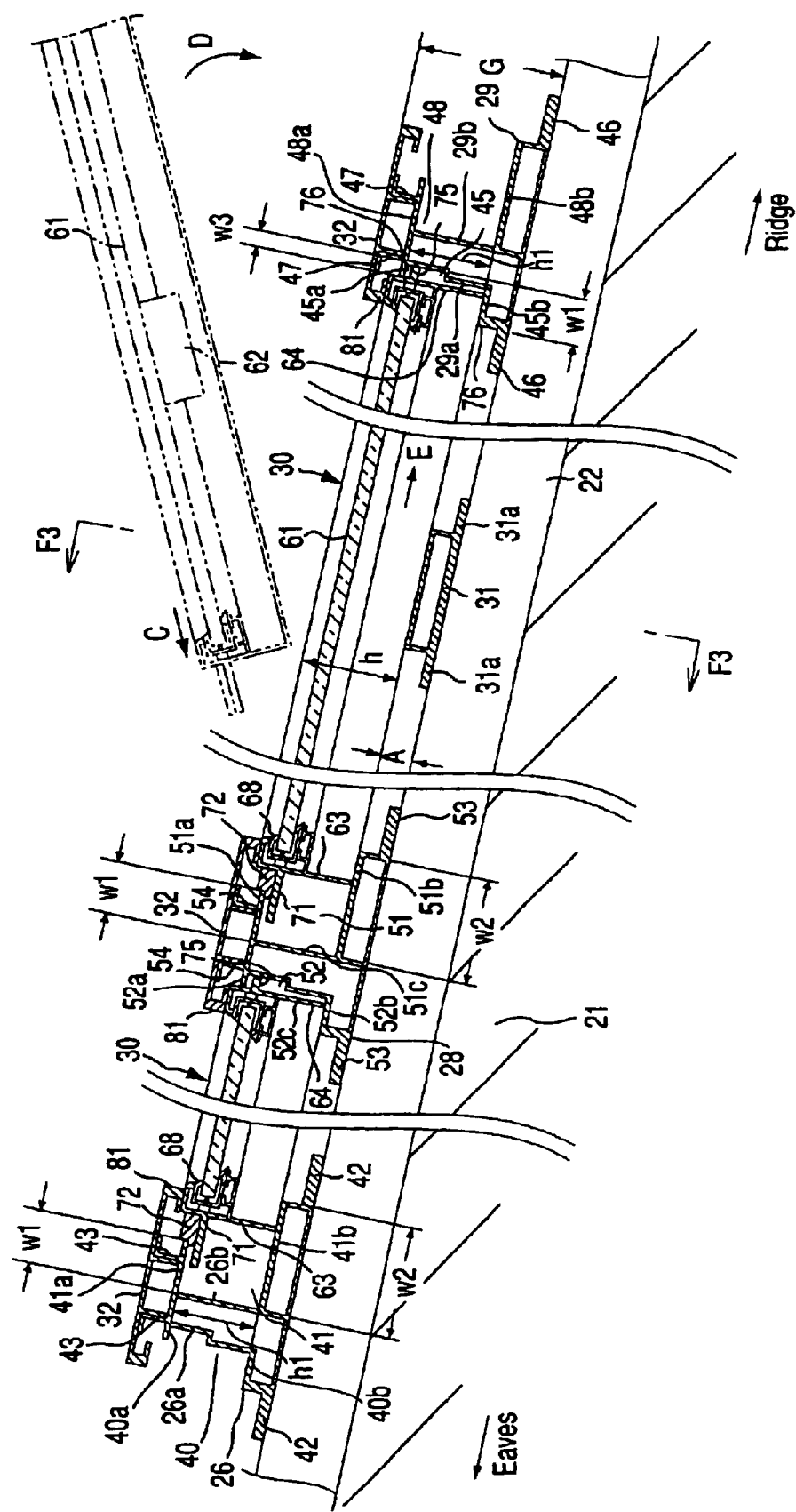
FIG. 2 is a cross-sectional view of the solar-power generating apparatus of FIG. 1, installed on the roof.
Figure 3:
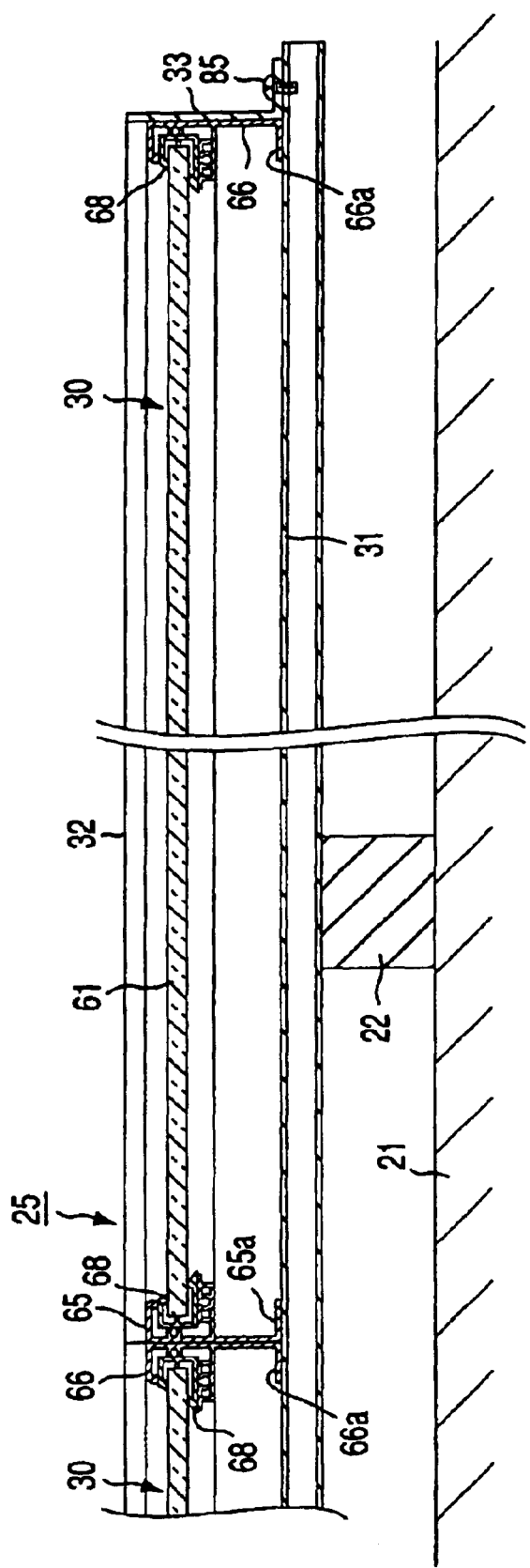
FIG. 3 is a cross-sectional view taken along line F3—F3 shown in FIG. 2.

In FIGS. 1 to 3, reference numeral 21 indicates the roof of a building, which slopes downwards from the ridge toward the eaves. The roof 21 has a plurality of tile-supporting bars 22 on its upper surface. The tile-supporting bars 22 are used as support bases. They extend in the direction the roof 21 slopes (that is, between the ridge and eaves of the roof). They are arranged are spaced, at regular intervals, in the direction (transverse direction) that is perpendicular to the direction the roof 21 slopes upwards from the eaves to the ridge.

On the roof 21 there is installed a solar-power generating apparatus 25 that generate electric power from the solar rays. The apparatus 25 comprises a plurality of support members 26 to 29, a plurality of photovoltaic modules 30, at least one auxiliary rail 31, a plurality of holding members 32, and a plurality of stoppers 33. The holding members 32 are secured to the support members 26 to 29. The auxiliary rail 31 may not be used.

The support members 26 to 29 are shaped like a rail. They are fastened to the tile-supporting bars 22 with screws or the like. The support members 26 to 29 thus fastened are parallel to one another, each extending in the transverse direction of the roof 21. Any adjacent two of the support members 26 to 29 are set apart by a distance that accords with the length of the photovoltaic modules 30 (i.e., the distance over which each module extends in the direction the roof slopes). Each of the support members 26 to 29 is constituted by at least one or more elements having a prescribed length, depending upon the size of the solar-power generating apparatus 25. If each support member is composed of two or more elements, the elements are axially aligned and connected together.

The support members 26 and 29 that lie close to the ridge and eaves of the roof, respectively, are called "end support members" or "end rails." The support members 27 and 28 that lie between the end rails are called "intermediate support members" or "intermediate rails." Of two support members arranged adjacent in the direction the roof slopes, the one closer to the ridge is called "ridge-side support member," and the other closer to the eaves is called "eaves-side support member."

The support member 26 is a bar of aluminum alloy, formed by extrusion. The support member 26 has an up-open groove 40, a down-open groove 41, a pair of flanges 42, and a pair of member-holding portions 43.

The support member 26 lies on the roof 21 as is illustrated in FIG. 2. In this state, the up-open groove 40 opens toward the ridge of the roof, and the down-open groove 41 toward the eaves of the roof. The two flanges 42 lie below the grooves 40 and 41, respectively. The two member-holding portions 43 lie above the grooves 40 and 41, respectively. The grooves 40 and 41, flanges 42 and member-holding portions 43 continuously extend in the lengthwise direction of the support member 26.

The up-open groove 40 is defined between an upper groove-wall 40a and a lower groove-wall 40b. A groove wall 26a closes the groove 40. The down-open groove 41 is defined between an upper groove-wall 41a and a lower groove-wall 41b, which are parallel to each other. A groove wall 26b closes the groove 41. The down-open groove 41 is deeper than the up-open groove 40. The up-open groove 40 and the down-open groove 41, which are position back to back, have a height h1 that is smaller than the thickness h of the photovoltaic modules 30. The upper groove-wall 41a has a width w1 that is smaller than the width w2 of the lower groove-wall 41b. Due to this relation in terms of width, the down-open groove 41 has a broader opening than in the case where the upper groove-wall 41a and lower groove-wall 41b have the same width.

The flanges 42 project from the lower edge of the support member 26 in the widthwise direction thereof. Screws (not shown) pass through these flanges 42 and are driven into the tile-supporting bars 22, thus securing the support member 26 on the roof 21. The member-holding portions 43 have a standing strip and an end strip. The end strip is bent and extends from the standing strip. The standing strips of the member-holding portions 43, which oppose each other, have a claw-holding part (not shown) each. The claw-holding parts are identical in configuration to the claw-holding parts 54a of the support members 27 and 28, which will be described later. The member-holding portions 43 may not be used if the solar-power generating apparatus 25 does not comprise the holding members 32.

The support member 29 is a bar of aluminum alloy, formed by extrusion. It is of the same configuration as the support member 26. Namely, the support member 29 has an up-open groove 45, a down-open groove 48, a pair of flanges 46, and a pair of member-holding portions 47.

The support member 29 lies on the roof 21. In this state, the up-open groove 45 opens toward the ridge of the roof, and the down-open groove 48 toward the eaves of the roof. The two flanges 46 lie below the grooves 45 and 48, respectively. The two member-holding portions 47 lie above the grooves 46 and 48, respectively. The down-open groove 48, up-open groove 45, flanges 46 and member-holding portions 47 continuously extend in the lengthwise direction of the support member 29.

The up-open groove 45 is defined between an upper groove-wall 45a and a lower groove-wall 45b. A groove wall 29a closes the groove 45. The down-open groove 48 is defined between an upper groove-wall 48a and a lower groove-wall 48b, which are parallel to each other. A groove wall 29b closes the groove 48. The down-open groove 48 is deeper than the up-open groove 45. The grooves 45 and 48, which are position back to back, have a height h1 that is smaller than the thickness h of the photovoltaic modules 30. The upper groove-wall 45a has a width w3 that is smaller than the width w4 of the lower groove-wall 45b. Due to this relation in terms of width, the up-open groove 45 has a broader opening than in the case where the upper groove-wall 45a and lower groove-wall 45b have the same width.

The flanges 46 project from the lower edge of the support member 29 in the widthwise direction thereof. Screws (not shown) pass through these flanges 46 and are driven into the tile-supporting bars 22, thus securing the support member 29 on the roof 21. The member-holding portions 47 have a standing strip and an end strip. The end strip is bent and extends from the standing strip. The standing strips of the member-holding portions 47, which oppose each other, have a claw-holding part (not shown) each. The claw-holding parts are identical in configuration to the claw-holding parts 54a of the support members 27 and 28, which will be described later. The member-holding portions 47 may not be used if the solar-power generating apparatus 25 does not comprise the holding members 32.

The support members 27 and 28 are bars made of aluminum alloy, formed by extrusion. Both bars 27 and 28 are identical in structure to the support members 26 and 29. That is, the support members 27 and 28 have a down-open groove 51, an up-open groove 52, a pair of flanges 53, and a pair of member-holding portions 54.

Figure 5:
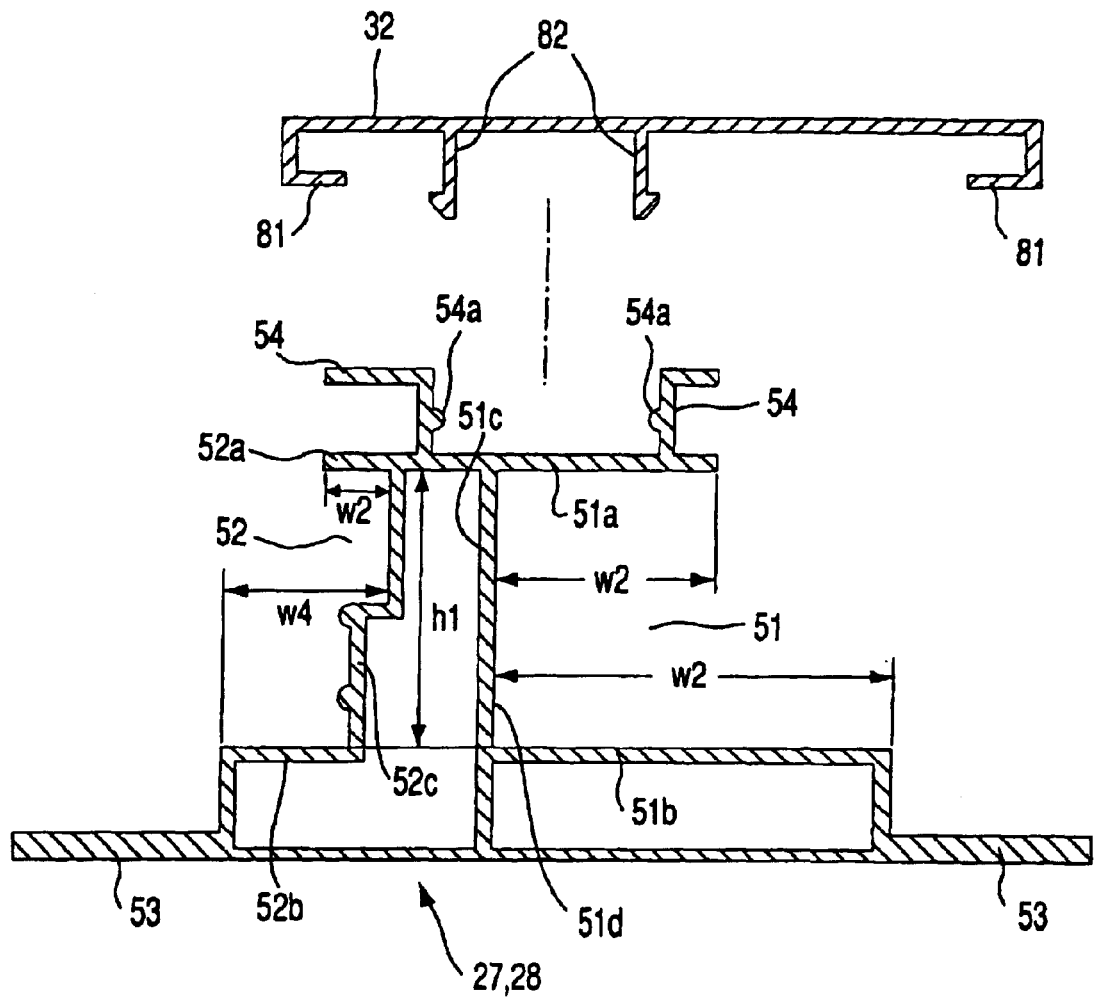
FIG. 5 is a cross-sectional view displaying the support member of the solar-power generating apparatus of FIG. 1, and showing the holding member that is to be attached to the support member.

The support members 27 and 28 are laid on the roof 21 as shown in FIGS. 2 and 5. In this state, the down-open grooves 51 open downwards, toward the eaves of the roof 21, while the up-open grooves 52 open upwards, toward the ridge of the roof 21. The flanges 53 lie below the grooves 51 and 52, respectively. The member-holding portions 54 lie above the grooves 51 and 52, respectively. The down-open grooves 51, up-open grooves 52, flanges 53 and member-holding portions 54 continuously extend in the lengthwise direction of the support members 27 and 28.

Each down-open wall 51 is defined, each between an upper groove-wall 51a and a lower groove-wall 51b, which are parallel to each other. A groove wall 51c closes each groove 51. The down-open groove 51 is deeper than the up-open grooves 52. The down-open groove 51 has a height h1 that is smaller than the thickness h of the photovoltaic modules 30. The upper groove-wall 51a has a width w1 that is smaller than the width w2 of the lower groove-walls 51b. Due to this relation in terms of width, the down-open groove 51 has a broader opening than in the case where the upper groove-walls 51a and lower groove-wall 51b have the same width.

Each up-open groove 52 is defined between an upper groove-wall 52a and a lower groove-wall 52b and positioned back to back with respect to the down-open groove 51. A groove wall 52c closes the up-open groove 52. The up-open groove 52 has a height h1 smaller than the thickness h of the photovoltaic modules 30. The upper groove-wall 52a has a width w3 that is smaller than the width w4 of the lower groove-wall 52b. Due to this relation in terms of width, the up-open groove 52 has an opening that is larger than in the case where the upper groove-wall 52a and lower groove-wall 52b have the same width.

The flanges 53 project from the lower edge of each of the support members 27 and 28. Screws (not shown) pass through these flanges 53 and are driven into the tile-supporting bars 22. Thus, the support members 27 and 28 are secured on the roof 21. The member-holding portions 54 have a standing strip and an end strip. The end strip is bent and extends from the standing strip. The standing strips of the member-holding portions 54, which oppose each other, have a claw-holding part 54a each. The claw-holding parts 54a are, for example, projections as is illustrated in FIG. 5. Alternatively, the claw-holding parts 54a may be stepped parts. The member-holding portions 54 may not be used if the solar-power generating apparatus 25 does not comprise the holding members 32.

Figure 4A:
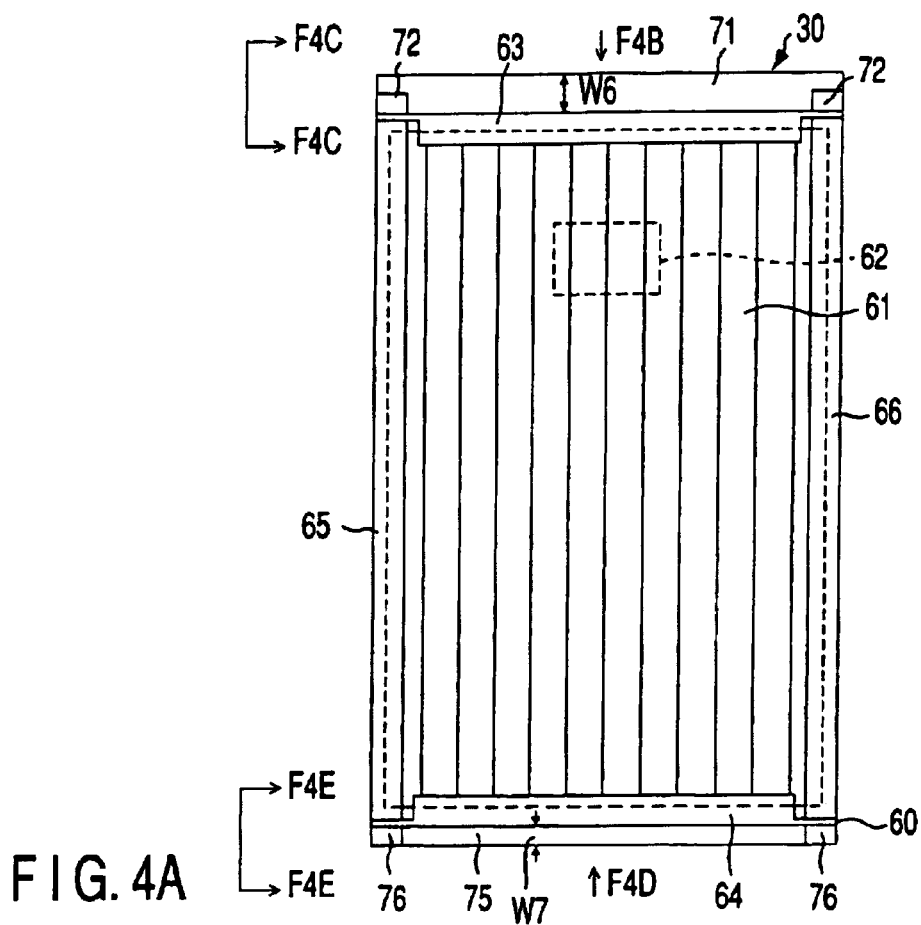
FIG. 4A is a plan view showing one of the photovoltaic modules provided in the solar-power generating apparatus of FIG. 1.
Figure 6:
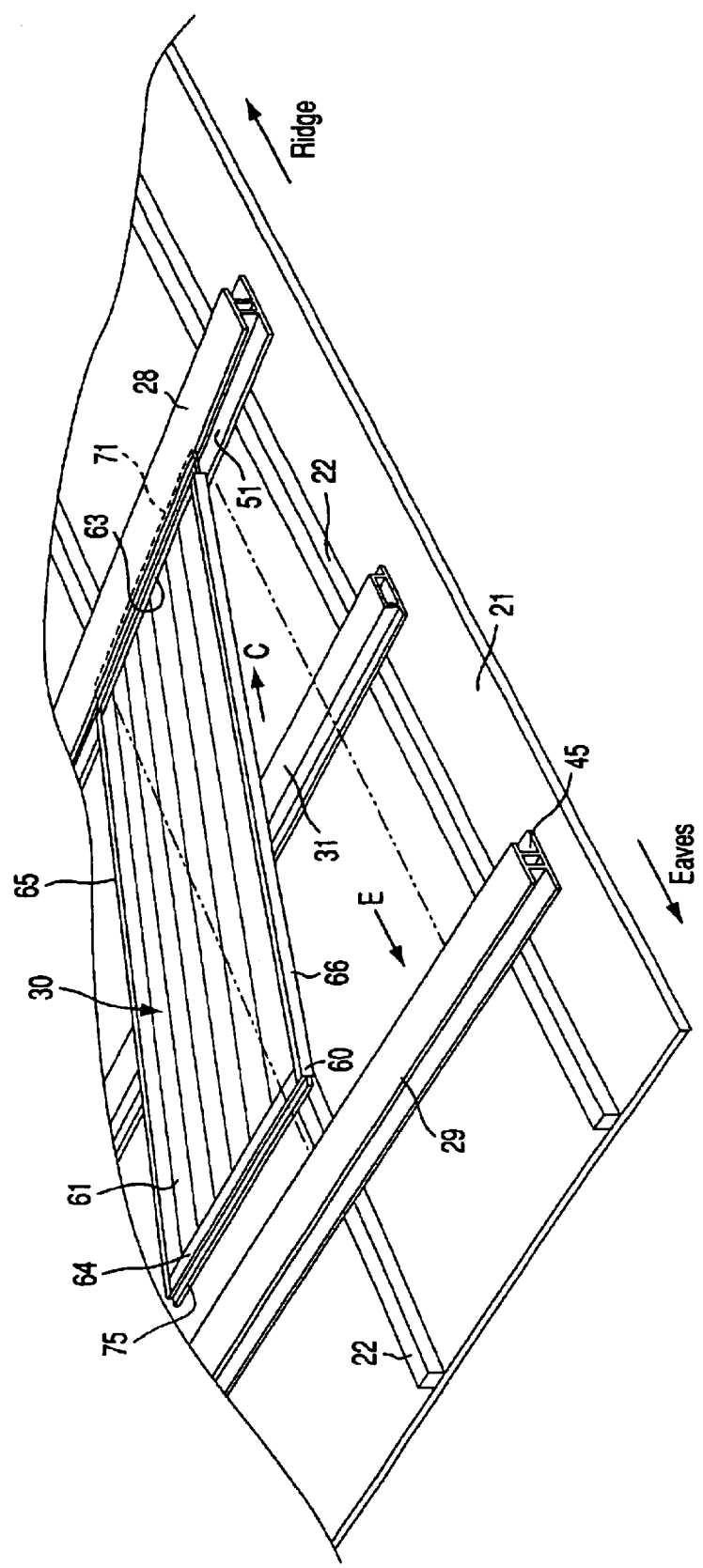
FIG. 6 is a perspective view, explaining the sequence of steps of fitting a photovoltaic module of the solar-power generating apparatus illustrated in FIG. 1.
Figure 7:
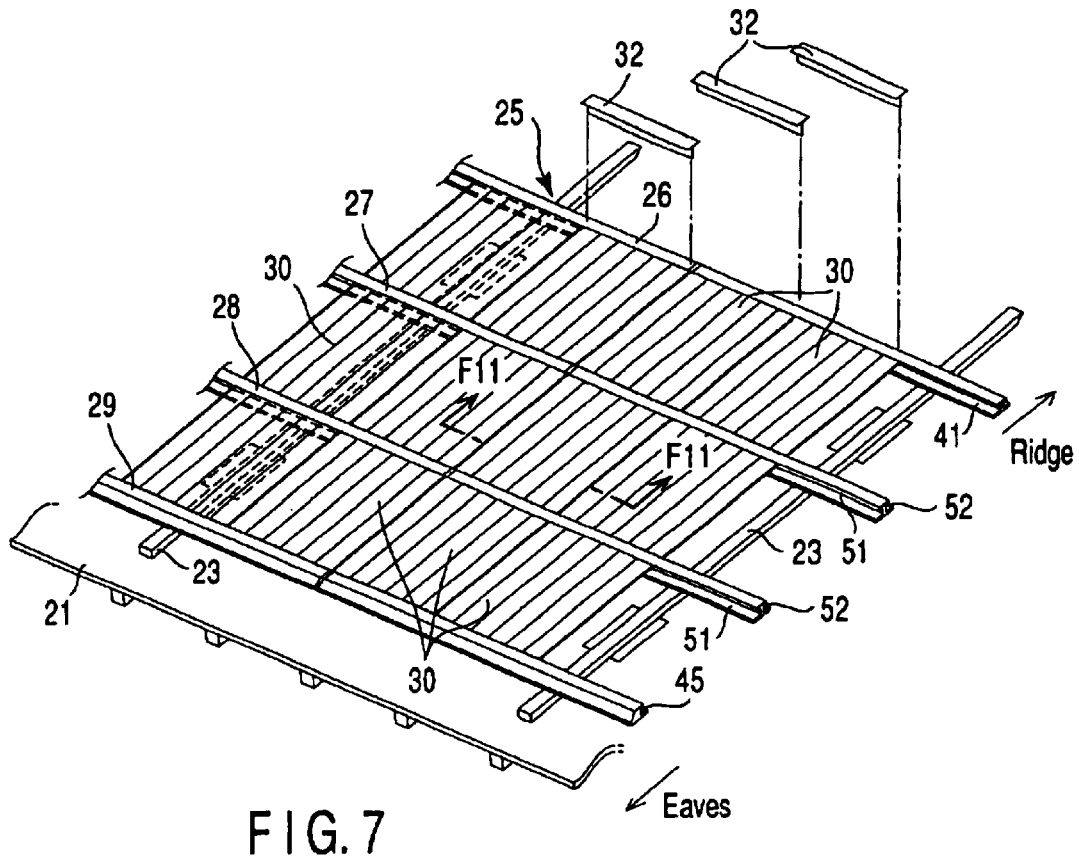
FIG. 7 is a perspective view of a solar-power generating apparatus according to a second embodiment of the invention, also depicting the roof of a building.

As FIG. 4A and FIG. 6 show, each of the photovoltaic module 30 comprises a rectangular module body 61, a metal frame 60 attached to the module body 61, and a terminal box 62 fastened to the back of the module body 61. The frame 60 is composed of an upper bar 63, a lower bar 64, a left side bar 65, and a right side bar 66, which are made of aluminum alloy, formed by extrusion and coupled together.

The upper bar 63 fitted in the upper edge of the module body 61. The lower bar 64 is fitted in the lower edge of the module body 61. The side bars 65 and 66 are fitted in the left and right sides of the module body 61, respectively. The bars 63 to 66 are coupled together, forming a frame, by means of screws 67 shown in FIGS. 4B to 4E. In FIGS. 2 and 3, reference numerals 68 designate gaskets.

The module body 61 comprises a rectangular substrate and photovoltaic cells thin-film type. The substrate is made of transparent glass. The photovoltaic cells are provided on the back of the substrate and covered with a sealing layer.

The structure of the photovoltaic cells will be described. A transparent electrode layer is formed on the substrate of transparent glass. This layer is divided into a plurality of photo-electromotive regions. A thin-film, photo-electromotive semiconductor layer is formed on the transparent electrode layer. The semiconductor layer is divided into a plurality of regions (or photo-electromotive elements). A back electrode layer is formed on the photo-electromotive elements, thus electrically connecting these elements in series. Each photovoltaic cell has a pair of bus regions. The bus regions serve as the terminals of the electrical connection, for collecting electric power. Bus bars are soldered to the bus regions, respectively, and function as electrodes.

Two lead wires are soldered at one end to the bus bars of the photovoltaic cell that has the structure specified above. The lead wires penetrate the aforementioned sealing layer and are connected to the terminal box 62. To the terminal box 62 there are connected two output cables (not shown), i.e., positive and negative cables.

The frame bars 63 to 66 have the same thickness h3, which is the thickness of the photovoltaic module 30. The upper bar 63 and lower bar 64 of the frame contact any of the lower groove-walls 41b, 45b, 51b and 52b and is thus supported thereby. As FIG. 3 shows, the side bars 65 and 66 have lower strips 65a and 66b, respectively. The auxiliary rail 31 supports these strips.

As seen from FIG. 2 and FIGS. 4A to 4C, an insertion projection 71 protrudes from, and is integrally formed of, the upper bar 63. The projection 71 lies at a midpoint over the thickness of the upper bar 63. More precisely, the projection 71 should better be provided at a position above said midpoint, preferably at a distance of one-third of the thickness h3 of the upper bar 63 below the upper surface of the upper bar 63. The insertion projection 71 catches and, hence, holds the upper groove-wall 41a or 51a. The projection 71 is a thin flat plate that is far thinner than the upper bar 63. It extends in the lengthwise direction of the upper bar 63. The projection 71 has a width w5 that is several times as much as the width w7 of an insertion projection 75. The insertion projection 75 will be described later.

Figure 4B:
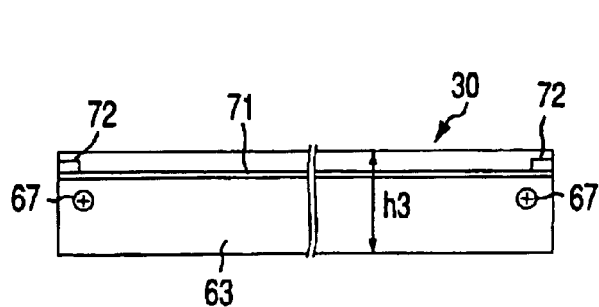
FIG. 4B is a top view of the photovoltaic module looked in the direction of arrow F4B shown in FIG. 4A.
Figure 4C:
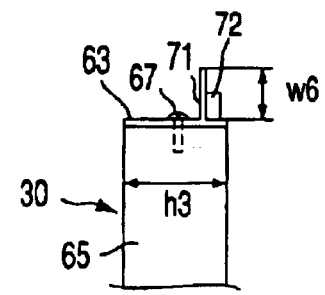
FIG. 4C is a side view depicting the upper part of the photovoltaic module, looked in the direction of arrows F4C shown in FIG. 4A.
Figure 4D:
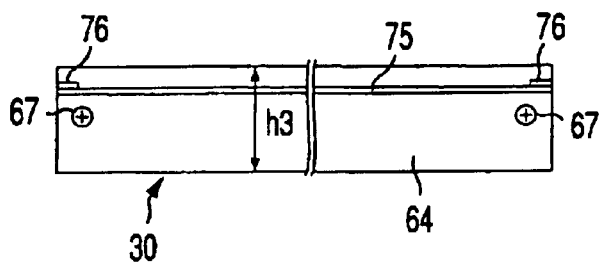
FIG. 4D is a bottom view of the photovoltaic module observed in the direction of arrow F4D shown in FIG. 4A.
Figure 4E:
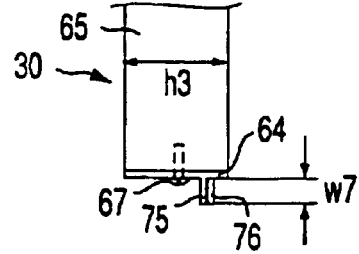
FIG. 4E is a side view illustrating the lower part of the photovoltaic module, looked in the direction of arrows F4E shown in FIG. 4A.

Buffering members 72 are bonded to the upper surface of the insertion projection 71, at least the end portions thereof. The buffering members 72 may be preferably rubber strips. Instead of rubber strips, black foamed tapes may be used, which are coated with adhesive on one side. The foamed tapes can be made of ethylene-propylene elastomer such as EPM (Ethylene-Propylene Copolymer), EPDM (Ethylene-Propylene Polymer) or the like. As FIGS. 4A and 4B show, a pair of buffering members 72 are spaced apart. This helps not only to reduce the required amount of material and lower the manufacturing cost, but also to make it easy for the user to perceive whether the buffering members are provided or not. The buffering members 72 may be adhered to the lower surfaces of the upper groove-walls 41a and 51a.

The lower bar 64 is as thick as the upper bar 63. As illustrated in FIG. 2 and FIGS. 4A, 4B and 4C, the insertion projection 75 protrudes from, and is integrally formed with, the lower bar 64. This projection 75 lies at a part of the lower bar 64, which is middle in the direction of thickness of the lower bar 64. More specifically, the insertion projection 75 may be located a little above the midpoint in the thickness direction. Preferably, the projection 75 may lie below the upper surface of the lower bar 64, at a distance that is a third of the thickness h3 of the lower bar 64. The insertion projection 75 contacts either the upper groove-wall 45a or the upper groove-wall 52a. It is thereby held by the wall 45a or 52a. This projection 75 is a flat, thin plate that is far thinner than the lower bar 64. It extends along the entire lower bar 64. The insertion projection 75 has a width w7 that is much smaller than the width w6 of the insertion projection 71.

Buffering members 76 are adhered to the upper surface of the insertion projection 75, at least the end portions of the projection 75. The buffering members 76 are elastic members, preferably rubber strips. Instead of the rubber strips, black foamed tapes may be used, which are coated with adhesive on one side. The foamed tapes can be made of ethylene-propylene elastomer such as EPM, EPDM or the like. As FIGS. 4A and 4D display, a pair of buffering members 76 are spaced apart. This helps not only to reduce the amount of material required for the members 76 and lower the manufacturing cost, but also to make it easy for the user to perceive whether the buffering members are provided or not. The buffering members 76 may be adhered to the lower surfaces of the upper groove-walls 45a and 52a.

As illustrated in FIG. 1, each auxiliary rail 31 lies between two adjacent support members, one close to the ridge of the roof 21 and the other close to the eaves of the roof 21 and extends parallel to these support members. The auxiliary rails 31 are hollow bars made of aluminum alloy, formed by extrusion. As FIG. 2 shows, each auxiliary rail 31 has a flange 31a that projects in the widthwise direction. The auxiliary rails 31 are fastened to the roof 21 by means of screws (not shown) that pass through the rails 31 and are driven into the tile-supporting bars 22.

Symbol A in FIG. 2 indicates the distance by which the photovoltaic module 30 is spaced apart from a tile-supporting bar 22, or the distance between the upper surface of the auxiliary rail 31 and the upper surface of the lower groove-wall 41b, 45b, 51b or 52b. The distance A is long enough for the output cables (not shown) to pass through and short enough to prevent the connectors on the tips of the cables from passing through. This imparts a small height to the solar-power generating apparatus 25. The support members 26 to 29 and the auxiliary rails 31 can therefore be thin, which lowers the manufacturing cost.

The holding members 32 are bars of aluminum alloy, formed by extrusion. The members 32 have a length that is an integral multiple of the width of the photovoltaic modules 30. The holding members 32 shown in the drawing are as long as the photovoltaic modules 30 are broad. As best shown in FIG. 5, each holding member 32 has two frame-holding portions 81 and two engagement claws 82. The frame-holding portions 81 are provided at the lateral edges of the member 32. The claws 82 lie between the frame-holding portions 81. The holding member 32 is pushed from above onto the member-holding portion 54 of one support member 26, 27, 28 or 29 and thereby fastened to the support member, with the engagement claws 82 fitted in the claw-holding parts 54a of the member-holding portion 54.

The stoppers 33 are bars of aluminum allow, formed by extrusion. As shown in FIG. 1, the stoppers 33 extend at right angles to the direction the roof 21 slopes upwards from the eaves to the ridge. The stoppers 33 are secured, holding the photovoltaic modules 30 that are arranged, side by side, in the transverse direction of the roof 21. To be more specific, the stoppers 33 are coupled to the auxiliary rails 31 respectively, by screws 85 as best shown in FIG. 3. Thus secured, the stoppers 33 prevent the photovoltaic modules 30 from moving, which are arranged in the transverse direction of the roof 21.

The sequence of installing the solar-power generating apparatus 25 on the roof 21 will be explained below.

First, the support members 26 and 29 that are the ridge-side end rail and eaves-side end rail, respectively, and the support members 27 and 28 that are intermediate rails are laid parallel to one another, at specific intervals in the direction the roof 21 slopes. The support members 26 to 29 thus laid are fastened to the roof 21. The auxiliary rails 31 are laid, each between two support members that are adjacent in the direction the roof 21 slopes and each parallel to the support members 26 to 29. The rails 31 thus laid are fastened to the roof 21. The support members 26 to 29 and the auxiliary rails 31 are secured by screws to the tile-supporting bars 22 that are laid on the roof 21. It does not matter whether the support members 26 to 29 are fastened before the auxiliary rails 31, or vice versa.

Then, the photovoltaic modules 30 are fitted, each in a ridge-side support member and the adjacent eaves-side support member. How each photovoltaic module is laid and secured to the ridge-side support member 28 and the eaves-side support member 29.

First, the photovoltaic module 30 is inclined in a direction opposite to the direction the roof 21 slopes, as depicted by the two-dot dashed lines in FIG. 2 or by the solid lines in FIG. 6. The insertion projection 71 of the upper bar 63 of the module 30 is inserted into the down-open groove 51 of the ridge-side support member 28. In FIGS. 2 and 6, arrow C indicates the direction the module 30 is inserted. Next, the photovoltaic module 30 is turned around the ridge-side support member 28 or the upper bar 63, moving the lower bar 64 toward the eaves-side support member 29. Arrow D in FIGS. 2 and 6 indicates the direction in which the module 30 is rotated. As the module 30 is so rotated, the lower bar 64 approaches and opposes the up-open groove 45 of the eaves-side support member 29. Thereafter, let the photovoltaic module 30 move to the eaves-side support member 29 under its own weight, in the direction of arrow E shown in FIGS. 2 and 6. The hands may be used to move the photovoltaic module 30 more readily in the direction of arrow E. As the module 30 is so moved, the insertion projection 75 provided on the lower bar 64 is inserted into the upper-open groove 45. In this case, the insertion projection 71 remains inserted in the down-open groove 51, due to the relation between the width of the projection 71 and the depth of the down-open groove 51. Thus, the photovoltaic module 30 is partly fitted in the adjacent support members 28 and 29 that are spaced apart in the direction the roof slopes upwards from the eaves to the ridge.

All photovoltaic modules 30 are sequentially laid on the roof 21 by the method described above. Once each photovoltaic modules 30 is so laid, the middle parts of its side bars 65 and 66 are mounted on one auxiliary rail 31. Thus, the auxiliary rail 31 holds the back of the photovoltaic module 30. The side bars 65 and 66 of each photovoltaic module 30 contact the side bar 66 of one adjacent photovoltaic module and the side bar 65 of the other adjacent photovoltaic module, respectively (see FIG. 3).

After the photovoltaic modules 30 are arranged as described above, the stoppers 33 are laid at the ends of each group of photovoltaic modules 30. The stoppers 33 are fastened by screws to the auxiliary rails 31. The stoppers 33 therefore secure the photovoltaic modules 30 of each group, preventing them from moving in the transverse direction of the roof 21.

Finally, the holding members 32 are laid on the support members 26 to 29, concealing them. The holding members 32 are then aligned with, and pressed onto, the support members 26 to 29. The engagement claws 82 of the holding members 32 are fitted into the claw-holding parts 54a of the support members 26 to 29. Thus, the holding members 32 are secured to the support members 26 to 28 and covers the support members 26 to 29. The members 32 thus secured hold, from above, the upper bar 63 and lower bar 64 of each photovoltaic module 30. The upper bar 63 and the lower bar 64 are clamped between the frame-holding portion 81 and the lower groove-walls 41b, 45b, 51b and 52b. The holding members 32 may be secured to the support members 26 to 29, before the stoppers 33 are fastened to the auxiliary rails.

The solar-power generating apparatus 25 is installed on the roof 21 in the sequence of steps, described above. In the step of arranging the modules, it is unnecessary to insert the thickest part of the upper bar 63 into the down-open groove 41 or 51, while moving the bar 63 upwards and obliquely. The insertion projection 71, which is a thin flat plate, is moved upwards and obliquely until it is inserted into the down-open groove 41 or 51. Therefore, the insertion projection 71 would not slide in acute friction on the upper groove-wall 41a of the down-open groove 41 or the upper groove-wall 51a of the down-open groove 51. This renders it easy to insert the projection 71 into the down-open groove 41 or 51.

The line connecting the point where the upper bar 63 contacts the lower groove-wall 41b or 52b and the outermost point of the lower bar 64 (i.e., the distal end of the insertion projection 75 in this embodiment) is shorter, by the width w6 of the projection 71, than such a ling that connects the that point and the outermost point when the whole upper bar 63 is inserted into the down-open groove 41 or 51. Hence, the insertion projection 75 of the lower bar 64 hardly abuts on the upper groove-wall 45a or 52a of the eaves-side support member when the photovoltaic module 30 is rotated to move the lower bar 64 toward the eaves-side support member. It is therefore easy to rotate the photovoltaic module, even if the support members are arranged at short intervals in the direction the roof 21 slopes upwards from the eaves to the ridge.

The down-open groove 41 has a broad opening, because the width w2 of the lower groove-wall 41b is smaller than the width w1 of the upper groove-wall 41a. Similarly, the up-open groove 45 has a broad opening, because the width w3 of the upper groove-wall 45a is smaller than the width w4 of the upper groove-wall 51a. Likewise, the up-opened groove 52 has a broad opening, because the width w3 of the upper groove-wall 52a is smaller than the width w4 of the lower groove-wall 52b.

In view of this, too, the insertion projection 75 can be prevented from being caught and held by the upper groove-walls 41a, 45a, 51a and 52b when the photovoltaic module 30 is secured in the module-fitting sequence described above. Additionally, the insertion projection 71 can be inclined at large angles when it is moved into the down-open groove 41 or 51 in the direction of arrow C as indicated above, not only because the insertion projection 71 is thin, but also because the grooves 41 and 51 have a broad opening. This makes it easier to insert the projection 71 into the down-open groove 41 or 51. The angle, at which the projection 71 inclines when inserted, is defined by the roof 21 and the photovoltaic module 30 that is inclined in the opposite direction.

The terminal box 62 is provided on the back of the photovoltaic module 30 and located close to the upper bar 63. The upper bar 63 must assume such a position that it turns upward, in order to arrange the photovoltaic module 30. Since the upper bar 63 has the insertion projection 71 that has width w6 larger than that of the insertion projection 75, the position in which the module 30 is secured can be determined from the position of the insertion projection 71. This reduces the possibility that the photovoltaic module 30 is secured in a wrong orientation.

Thus, the photovoltaic modules 30 can be easily laid if they are secured in the sequence of steps, which has been described above.

The upper bar 63 of each photovoltaic module 30 thus installed lies on the lower groove-wall 41b of the down-open groove 41 or on the lower groove-wall 51b of the down-open groove 51. The insertion projection 71 protruding from the upper bar 63 is caught and held by the upper groove-wall 41a of the down-open groove 41 or the upper groove-wall 51a of the down-open groove 51, both grooves 41 and 51 being made in the ridge-side support member. The upper bar 63 is therefore prevented from moving in the direction of its thickness.

In this state, the buffering members 72 clamped between the upper groove-wall 41a or 51a and the insertion projection 71 prevents the photovoltaic module 30 from being loosely supported. More precisely, the projecting edge of the upper groove-wall 41a or 51a pushes each buffering member 72, the ridge-side part of which is held between the upper groove-wall 41a or 51a and the insertion projection 71 lying below the wall 41a or 51a. This is why the photovoltaic module 30 can be firmly held. In addition, the area in which the buffering member 72 and the upper groove-wall 41a or 51a contact is limited and small. Therefore, the buffering members 72 would not hinder the moving of the photovoltaic modules 30 in the transverse direction of the roof 21.

Similarly, the lower bar 64 is laid on the lower groove-wall 45b of the up-open groove 45 or on the lower groove-wall 52b of the up-open groove 52. The insertion projection 75 of the lower bar 64 is caught and held by either the upper groove-wall 45a of the up-open groove 45 or the upper groove-wall 52a of the up-open groove 52, both grooves 45 and 52 being made in the eaves-side support member. This prevents the lower bar 64 from moving in the direction of its thickness. In this case, too, the buttering members 76 clamped between the upper groove-wall 45a or 52a and the insertion projection 75 can prevent the photovoltaic module 30 from moving toward the ridge or eaves of the roof.

Therefore, the photovoltaic modules 30 would not slip out from the space between any two adjacent support members that are spaced apart in the direction the roof 21 slopes upwards from the eaves to the ridge.

The upper bar 63 and lower bar 64 of each photovoltaic module 30 are held from above by the frame-holding portions 81 of the holding members 32 that are provided on the two adjacent support members 26 to 29. The holding members 32 prevent the photovoltaic module 30 from slipping out of the space between the adjacent support members that are spaced apart in the direction the roof slopes. The holding members 32 therefore help to achieve firm and steady installation of the photovoltaic module 30.

Each holding member 32 lies above one support member (26, 27, 28 or 29), concealing the entire upper surface of the support member. The shape of the upper surface of the support member does not jeopardize the outer appearance of the solar-power generating apparatus 25. The solar-power generating apparatus 25 can attain a good outer appearance.

Two stoppers 33 are provided at the ends of each group of photovoltaic modules 30 that are laid on the roof 21 and arranged in the lengthwise direction of the support members 26 to 29. The stoppers 33 prevent the photovoltaic modules 30 from moving in said lengthwise direction. Thus, no measures need be taken to prevent all photovoltaic modules 30 of each group from moving. This greatly decreases the number of screws and other fixing members required for installing the solar-power generating apparatus 25.

As mentioned above, it is easy to secure each photovoltaic module 30 to and arrange between a ridge-side support member and the adjacent eaves-side support member in the process of installing the solar-power generating apparatus 25. Additionally, the number of screws required for the installation is very small. The efficiency of installing the solar-power generating apparatus 25 on the roof 21 therefore increases.

In the solar-power generating apparatus 25, the thickest part of the upper bar 63 of each photovoltaic module 30 need not be inserted into the down-open groove 41 or 51 of the ridge-side support member. Similarly, the thickness part of the lower bar 64 need not be inserted into the up-open groove 45 or 52 of the eaves-side support member. The down-open groove 41 or 51 and the up-open groove 45 or 52 can therefore have a width smaller than the thickness h of the photovoltaic module 30. It follows that the support members 26 to 29, each having these grooves, can have a smaller height than otherwise.

It is therefore possible to lower the material cost of the support members 26 to 29 and, ultimately the manufacturing cost of the solar-power generating apparatus 25. Further, the number of the fixing members, such as screws, required for installing the solar-power generating apparatus 25 can be greatly reduced. Thus, the number of steps securing the apparatus can be reduced, too. This also serves to decrease the cost of installing the solar-power generating apparatus 25.

The solar-power generating apparatus 25 comprises auxiliary rails 31 that are secured to the roof 21. The rails 31 support the photovoltaic modules 30, at the parts that are middle in the direction the roof 21 slopes upwards from the eaves to the ridge. Thus supported, the photovoltaic modules 30 are sufficiently resistant to the wind pressure applied to them downwards when a strong wind blows. The side bars 65 and 66 of each photovoltaic module 30 need not withstand the wind pressure. Not only the side bars 65 and 66, but also the upper bar 63 and the lower bar 64 can be thinner than otherwise. As a result, the photovoltaic modules 30 can be thinner as a whole. This helps to reduce the manufacturing cost of the photovoltaic modules 30 and, ultimately, the manufacturing cost of the solar-power generating apparatus 25.

Since the photovoltaic modules 30 can be made thin, the height of the solar-power generating apparatus 25 can be decreased. The step defined by the roof 21 and the apparatus 25 installed on the roof 21 is therefore low, improving the outer appearance of the solar-power generating apparatus 25. Particularly, the solar-power generating apparatus 25 has a small height G of (FIG. 2) that is about 40 mm, measured from the upper surface of each tile-supporting bar 22. If tiles are laid around the solar-power generating apparatus 25, the upper surface of each tile lies almost flush with the upper surface of the solar-power generating apparatus 25. This serves to greatly enhance the outer appearance of the roof 21.

The second embodiment of the present invention will be described, with reference to FIGS. 7 to 13. The second embodiment is basically the same as the first embodiment. Therefore, the components identical to similar to those of the first embodiment are designated at the same reference numerals and will not be described. Only the components different from those of the first embodiment will be explained.

The second embodiment differs from the first embodiment in that the lower groove-wall of each support member has a width that is set in accordance with the photovoltaic modules in order to make it easy to secure the photovoltaic modules; means is provided to prevent the photovoltaic modules from moving after the modules are secured; the earth cables are simplified; auxiliary rails are not used as in the first embodiment; and spacers are attached to the photovoltaic modules.

The second embodiment is a solar-power generating apparatus 25 installed on a sloping slated roof 21. The solar-power generating apparatus 25 comprises support bases 23, support members 26 to 29, and a plurality of photovoltaic modules 30. The support bases 23 are laid on the roof 21, each extending from the ridge to the eaves. The support members 26 to 29 are laid on the support bases 23, each crossing the support bases 23 at right angles. The photovoltaic modules 30 are arranged on the adjacent support members that are spaced apart in the direction the roof 21 slopes.

Figure 8:
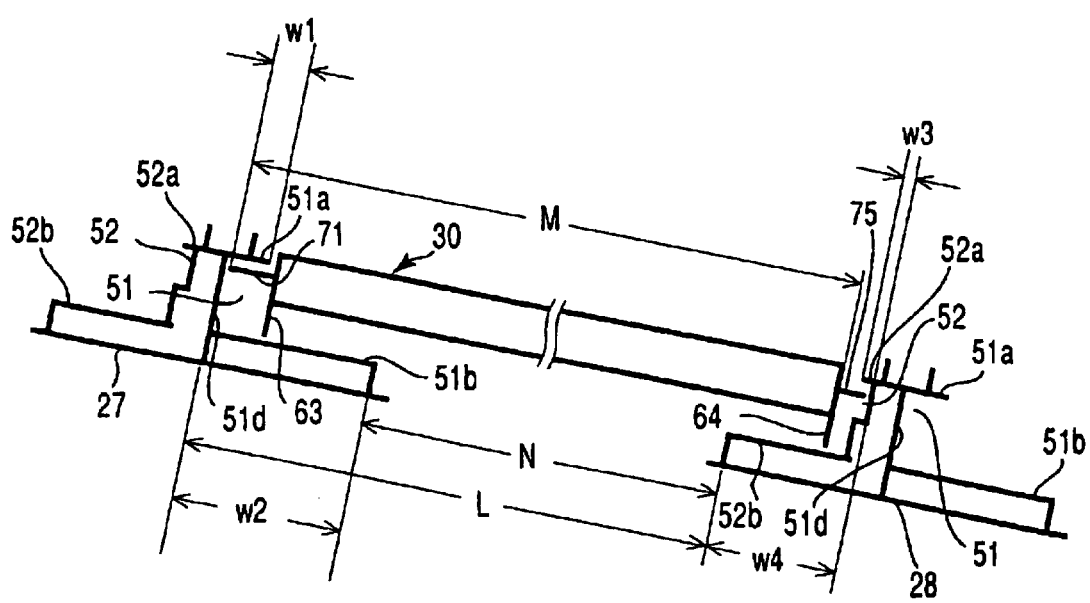
FIG. 8 is a diagram illustrating the relation between the length of each photovoltaic modules used in the solar-power generating apparatus and the inter-support distance of the photovoltaic module.
Figure 9:
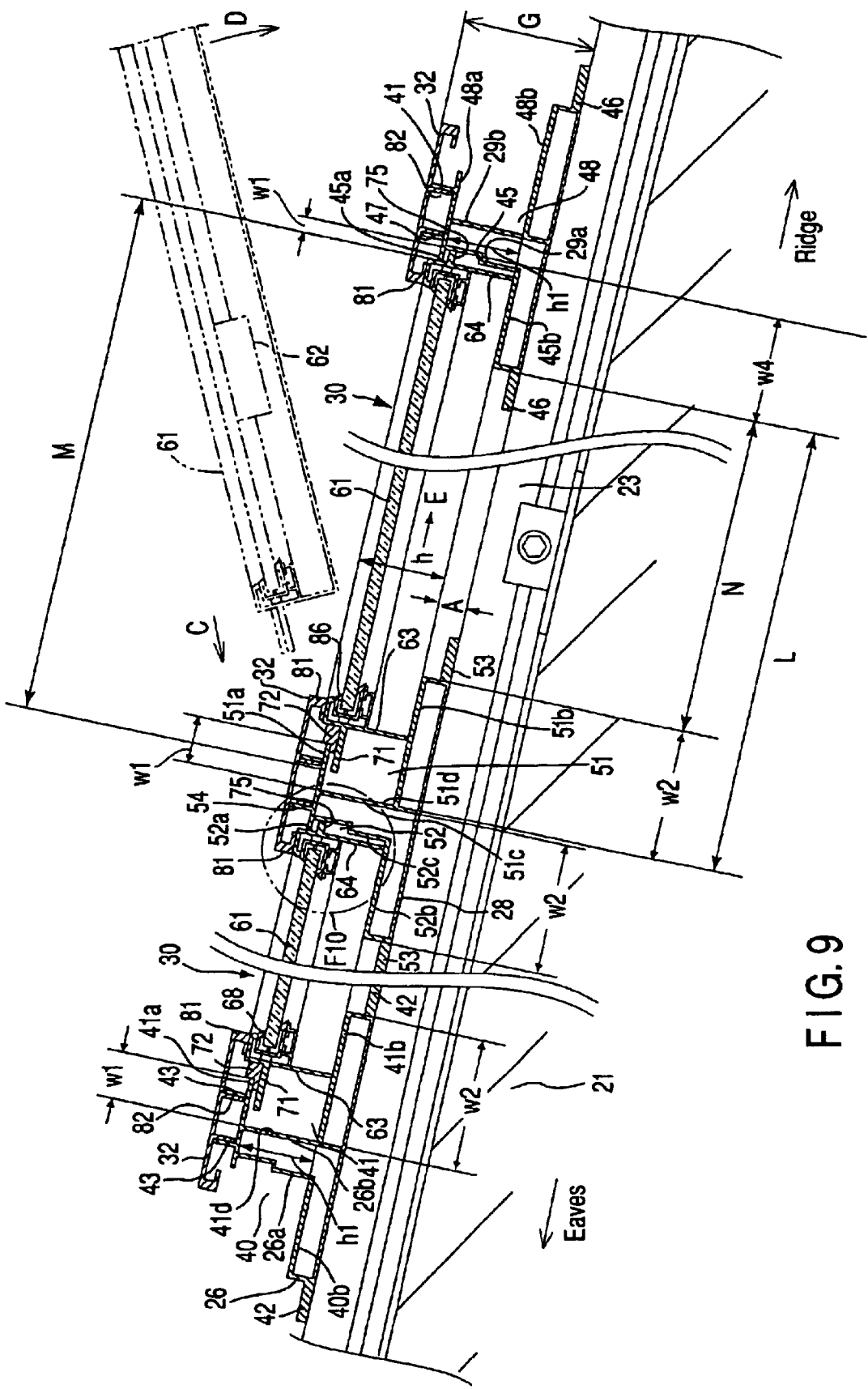
FIG. 9 is a cross-sectional view of the solar-power generating apparatus of FIG. 7, installed on the roof.

The lower groove-walls 45b and 52b of the eaves-side support members, which extend toward the ridge of the roof, have a width w4 that is far larger then the width w3 of the upper groove-walls 42a and 45a. As FIGS. 8 and 9 show, the distance L between the bottom surface 41d of the groove wall 26b of the down-open groove 41, or the bottom surface 51d of the bottom 51c of the down-open groove 51, and the ridge-side ends of the lower groove-walls 45b and 52b is shorter than the distance M between the insertion projection 71 of the photovoltaic module 30 and the root of the insertion projection 75 of the photovoltaic module 30. The distance N between the eaves-side ends of the lower groove-walls 41b and 51b of the ridge-side support members and the ridge-side ends of the lower groove-walls 45b and 52b is the distance between two positions where the photovoltaic modules 30 are supported at ends. The lower groove-walls 41b and 51b of the ridge-side support members have a width w2, which is much larger than the width w1 of the upper groove-walls 41a and 51a. This shortens the distance N between the supporting points.

Figure 10:
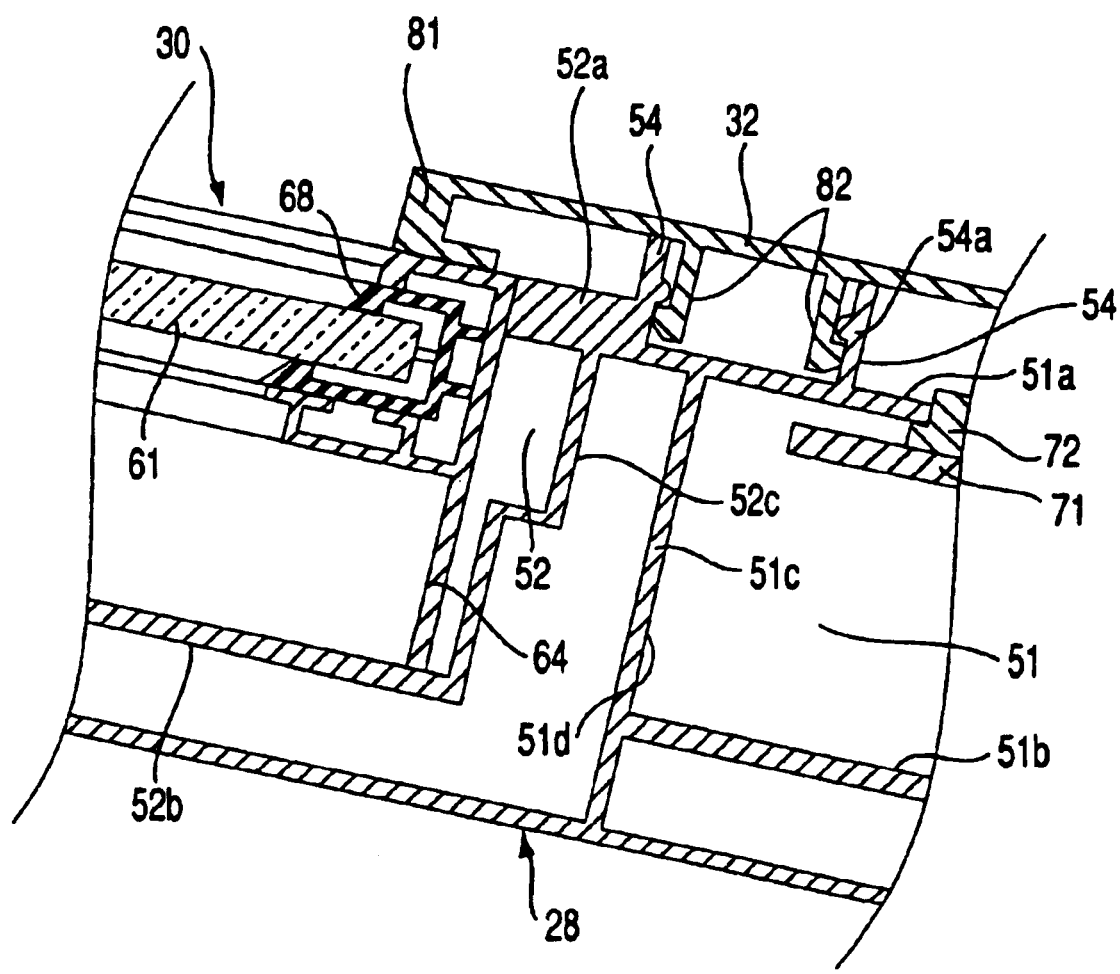
FIG. 10 is a magnified, cross-sectional view showing part F10 of the apparatus illustrated in FIG. 9.

As is best shown in FIG. 10, the member-holding portions 47 and 54 of the support members 26 to 29 are upright strips that do not cover the upper groove-walls 45a and 52a from above. This serves to reduce the manufacturing cost of the support members 26 to 29.

A plated layer (not shown) is formed on the surfaces of the frame bars 63 to 66 of each photovoltaic module 30, and a transparent protective layer (not shown) is formed on the plated layer. Reference numerals 65a and 66a in FIG. 11 denote the tapping holes made in the side bars 65 and 66, into which screws 67 are driven to assemble the frame 60.

Figure 11:
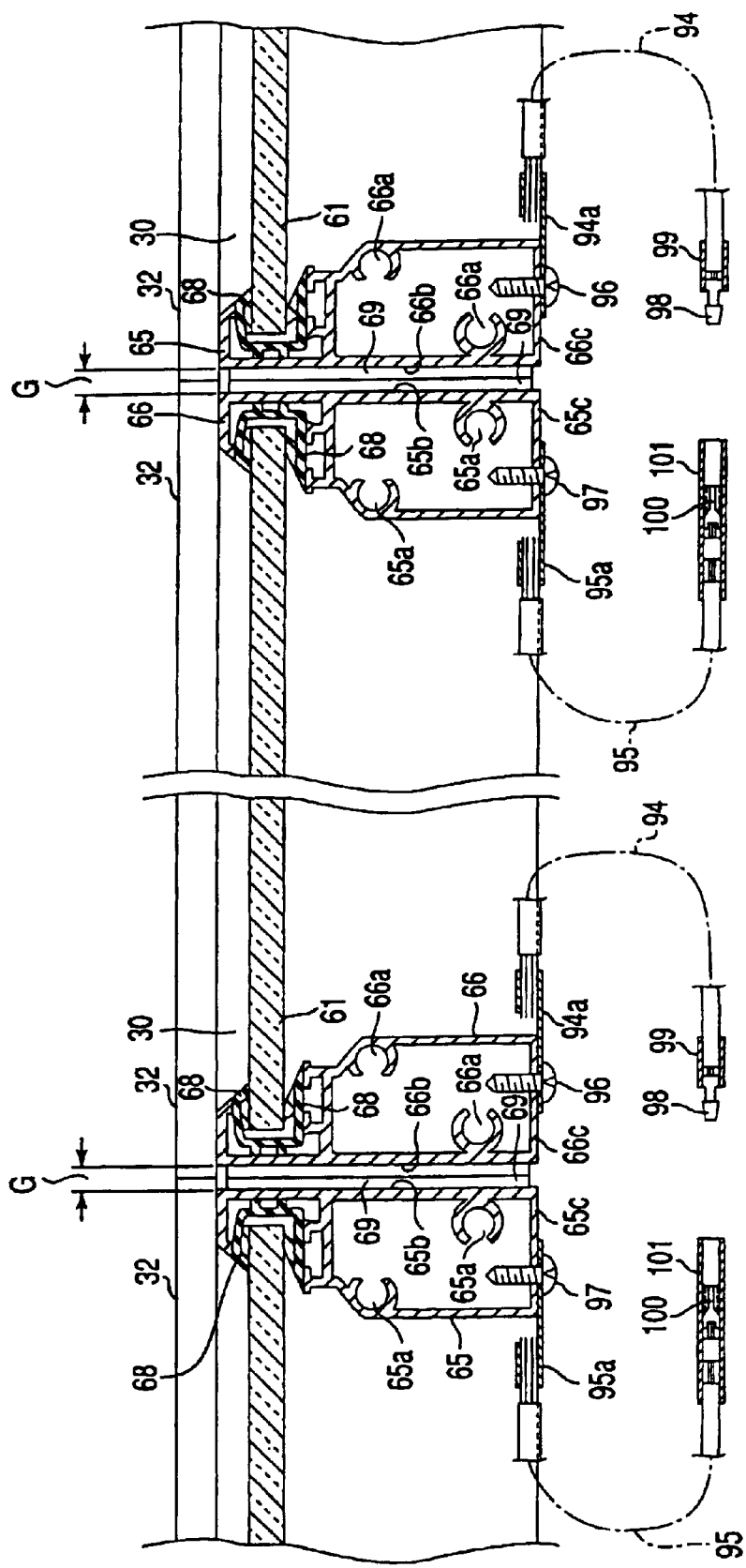
FIG. 11 is a cross-sectional view taken along line F11—F11 shown in FIG. 7.
Figure 12A:
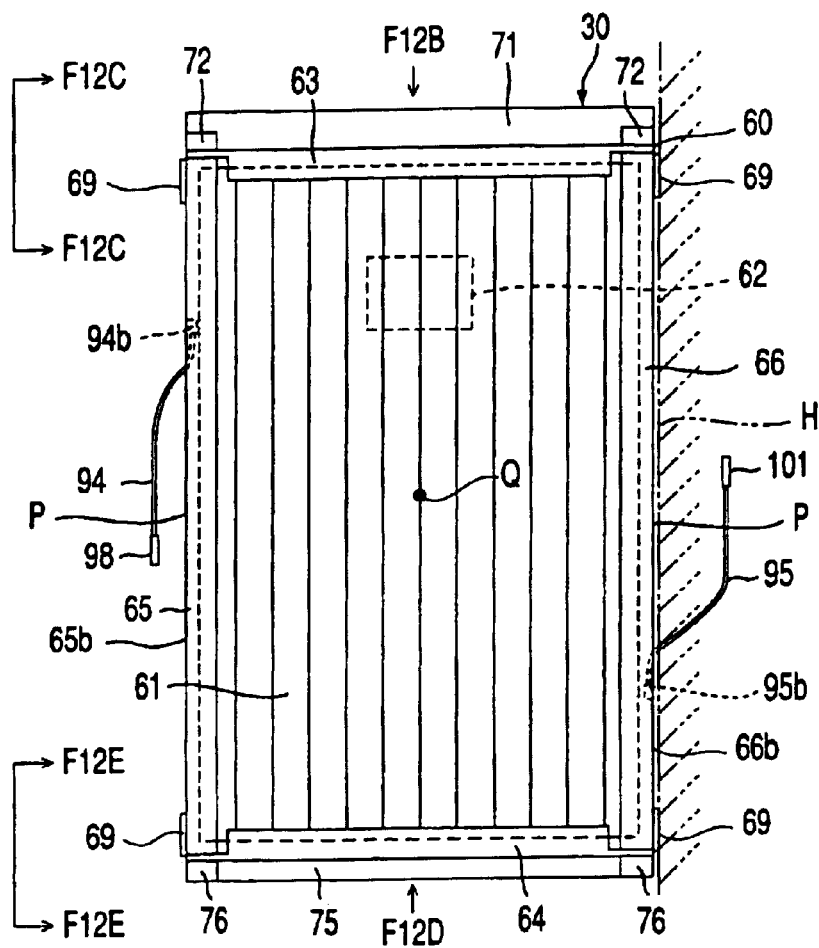
FIG. 12A is a plan view showing one of the photovoltaic modules provided in the solar-power generating apparatus of FIG. 7.
Figure 12B:
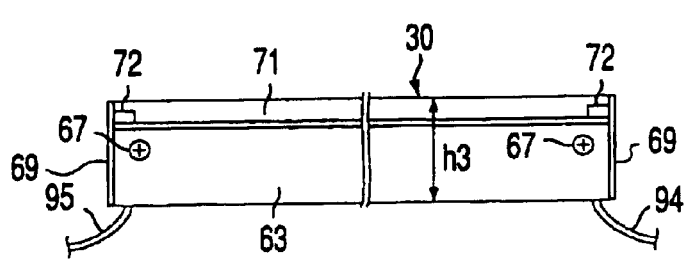
FIG. 12B is a top view of the photovoltaic module looked in the direction of arrow F12B shown in FIG. 12A.
Figure 12C:
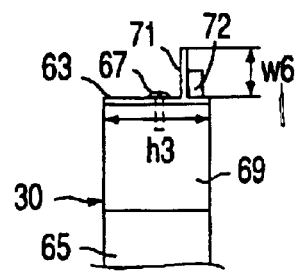
FIG. 12C is a side view depicting the upper part of the photovoltaic module, looked in the direction of arrows F12C shown in FIG. 12A.
Figure 12D:
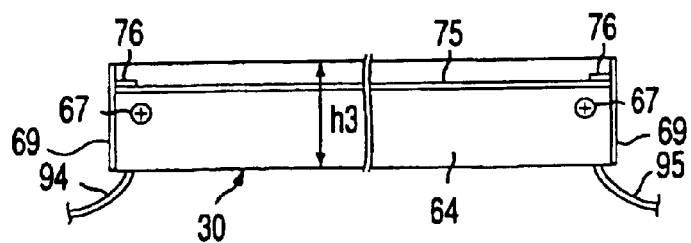
FIG. 12D is a bottom view of the photovoltaic module observed in the direction of arrow F12D shown in FIG. 12A.
Figure 12E:
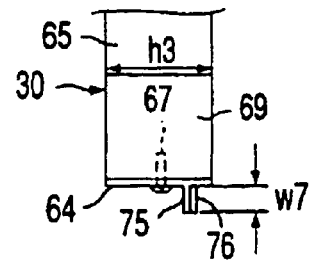
FIG. 12E is a side view illustrating the lower part of the photovoltaic module, looked in the direction of arrows F12E shown in FIG. 12A.
Figure 13:
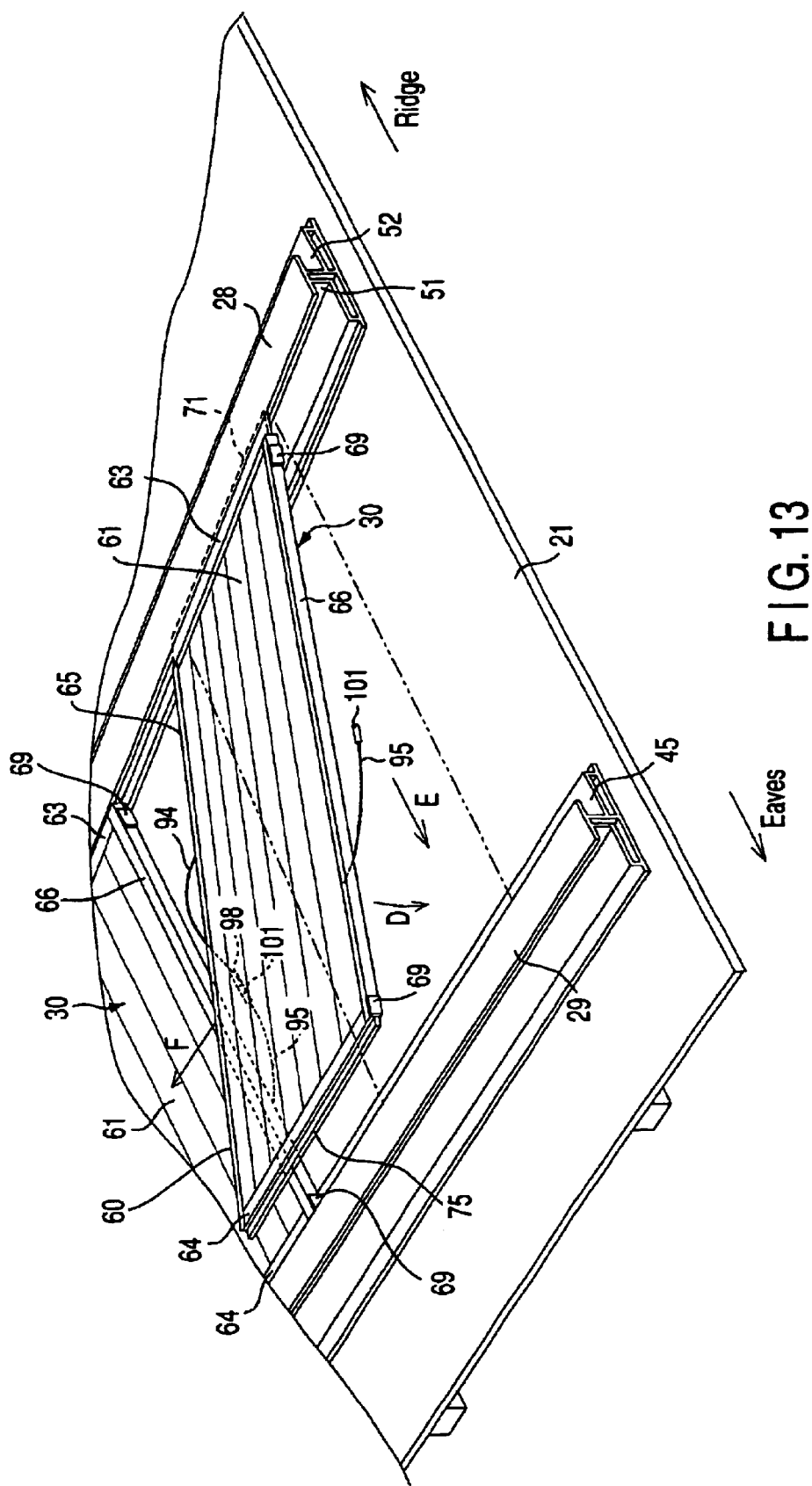
FIG. 13 is a perspective view, explaining the sequence of steps fitting a solar module of the solar-power generating apparatus depicted in FIG. 7.
Figure 14:
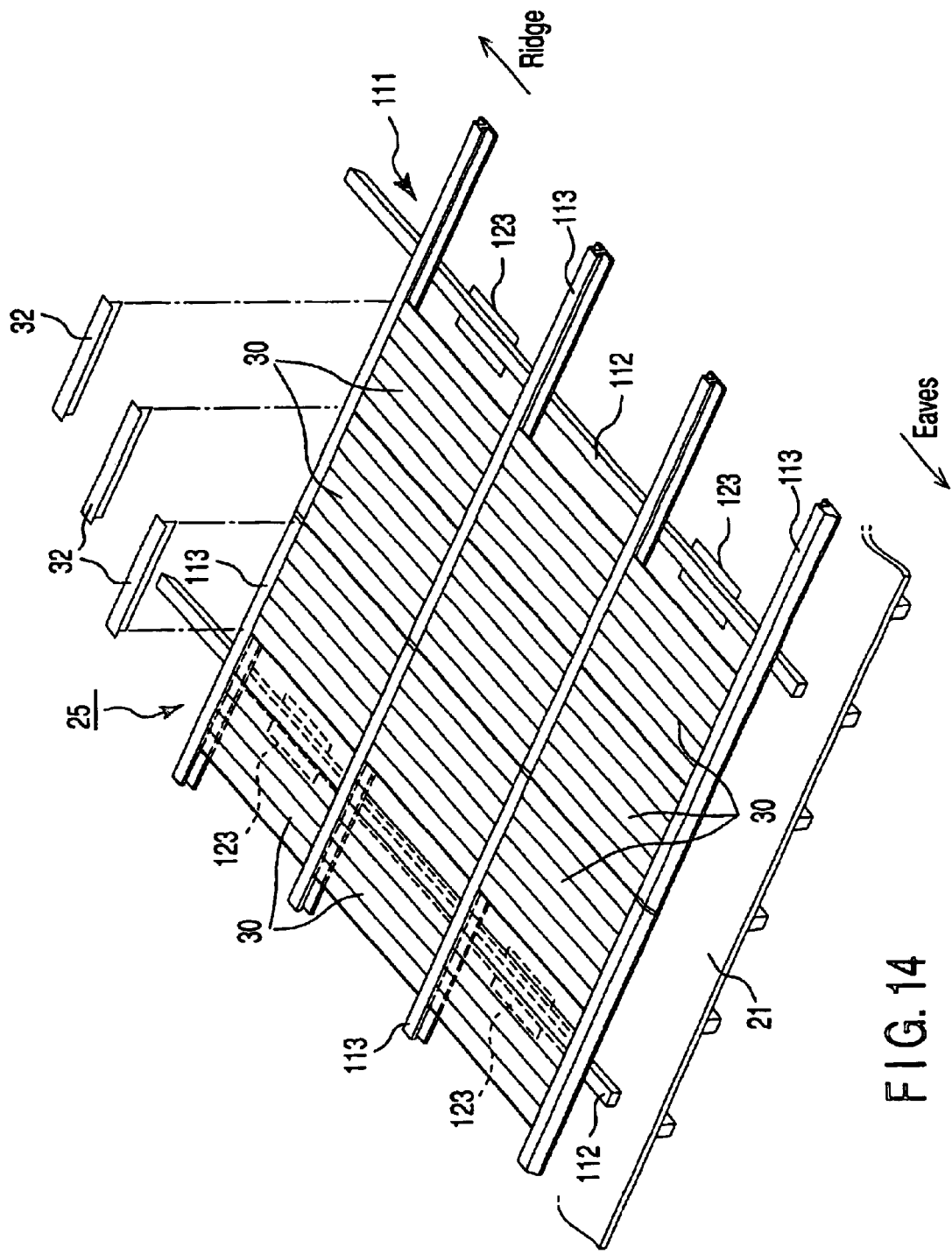
FIG. 14 is a perspective view of a solar-power generating apparatus according to a third embodiment of this invention, also depicting the roof of a building.

As FIGS. 11, 12A and 13 show, two spacers 69 are bonded to the ends of the outer side 65b of the side bar 65, and two spacers 69 are bonded to the ends of the outer side 66b of the side bar 66. The spacers 69 are made of buffering material that can elastically deform. They are, for example, rubber plates 0.5 mm to 3 mm thick. Alternatively, the spacers 69 may be foamed tapes made of black EPDM, each having one side coated with adhesive. It suffices to interpose spacers 69 between adjacent photovoltaic modules 30. The spacers 69 may be provided on the outer side of only the side bar 65 or 66.

The side bars 65 and 66 of each photovoltaic module 30 have been made by extrusion using the same mold. They have the same cross-sectional shape (see FIG. 11). Insulated electric wires 94 and 95 are connected to the side bars 65 and 66, respectively. The wires 94 and 95 are used to connect the photovoltaic modules 30 to the ground. Note that the modules 30 are arranged in the transverse direction of the roof 21. The electric wires 94 and 95 have the same length. As shown in FIG. 12A, they are secured at one end to the side bars 65 and 66 at points 94b and 95b, respectively. They are long, passing a little over the midpoints P on the side bars 65 and 66.

To be more specific, a metal terminal 94a is secured to one end of the electric wire 94 by means of pressing. A screw 96 made of metal fastens the terminal 94a to the side bar 65, preferably at a position 94b that lies at a distance from the upper end of the side bar 65, said distance being about a third or quarter of the length of the side bar 65. The screw 96 is driven into the lower wall 65c of the side bar 65, passing through the terminal 94a (see FIG. 11). Since the terminal 94a is thus secured to the wire 94, the electric wire 94 is electrically connected to the side bar 65 by the screw 96. A metal terminal 95a is secured to one end of the electric wire 95 by means of pressing. A screw 97 made of metal fastens the terminal 95a to the side bar 66, preferably at a position 95b that lies at a distance from the lower end of the side bar 66, said distance being about a third or quarter of the length of the side bar 66. The screw 97 is driven into the lower wall 66c of the side bar 65, passing through the terminal 95a (see FIG. 11). The screw 97 is driven into the lower wall 66c of the side bar 66, passing through the terminal 95a (see FIG. 11). It is with respect to point Q shown in FIG. 12 that the positions 94b and 95b are located symmetrically.

As FIGS. 11, 12A and 13 show, the electric wire 94 has a male connection terminal 98 at its distal end. The terminal 98 is made of metal and secured to the wire 94 by pressing. An insulating tube 99 covers the pressed part of the terminal 98. The electric wire 95 has a female connection terminal 100 at its distal end. This terminal 100 is made of metal and secured to the wire 95 by pressing. An insulating tube 101, which is longer than the terminal 100, covers the female connection terminal 100. The male connection terminal 98 can be inserted into the female connection terminal 100 and thereby be connected to the terminal 100. When the terminal 98 is thus connected to the terminal 100, the insulating tube 99 covers the distal part of the insulating tube 101. At the time the terminals 98 and 100 are thus connected, the metal frames 60 of the photovoltaic module 30 are electrically connected to one another. The second embodiment is identical in structure to the first embodiment, except for the points explained above.

The second embodiment is advantageous over the first embodiment in the following respects. In the second embodiment, the distance L between the bottom surface 41d of the down-open groove 41 of the ridge-side support member, or the bottom surface 51d of the down-open groove 51 of the down-side support member, and the ridge-side ends of the lower groove-walls 45b and 52b of the eaves-side support member is shorter than the distance M between the insertion projection 71 of the photovoltaic module 30 and the root of the insertion projection 75 of the photovoltaic module 30. Hence, the lower bar 64 is hardly be held at the ridge-side ends of the lower groove-walls 45b and 52b when the photovoltaic module 30 is rotated on the ridge-side support member to move toward the eaves-side support member in the process of installing the module 30 by securing the same to the support members. Thus, the lower bar 64 can reliably mounted on both lower grooves walls 45b and 52b. This renders it easy to install the photovoltaic module 30.

In the second embodiment, the lower groove-walls 41b and 51b of the ridge-side support members project toward the eaves by a long distance. It is therefore easy to lay the upper bars 63 of the photovoltaic modules 30 can easily abut on the lower groove-walls 41b and 51b when the upper bars 63 are inserted into the down-open grooves 41 and 51 of the photovoltaic modules 30 in the course of fastening the modules. Namely, the lower groove-walls 41b and 51b act as guides, facilitating the insertion of the upper bars 63 into the down-open grooves 41 and 51. This helps to enhance the efficiency of securing the photovoltaic modules 30.

In the second embodiment, the lower groove-walls 41b and 51b of the ridge-side support members extend, respectively, toward the lower groove-walls 45b and 52b of the eaves-side support members. The distance N between two positions where each photovoltaic module 30 is supported at ends is, therefore, short. This gives the photovoltaic module 30 an increased resistance to the wind pressure applied to the bottom of the module 30. The frame bars of each photovoltaic module 30 need not withstand the wind pressure by themselves. The frame bars 63 to 66 can be made thin. Ultimately, the solar-power generating apparatus 25 can be thin and be manufactured at low cost. Since the aforementioned pressure resistance is increased in the second embodiment, it is not necessary to used auxiliary rails as in the first embodiment. This further lowers the manufacturing cost.

In the solar-power generating apparatus 25 that is the second embodiment, any photovoltaic modules 30 adjacent in the transverse direction of the roof 21 can be electrically connected, as will be described below, when they are secured to the roof 21. Thus, the photovoltaic modules 30 can be connected to the ground.

After any photovoltaic module 30 is secured to the roof, the next photovoltaic module 30 is secured. Namely, this module is moved to the module 30 already secured, using the ridge- and eaves-side support members as guides, until it contacts the module 30 already secured to the roof. In FIG. 13, arrow F indicates the direction in which the photovoltaic module 30 is moved. When the module 30 contacts the already secured one, the connection terminal 98 of the electric wire 94 attached to its side bar 66 is connected to the connection terminal 100 of the electric wire 95 that is attached to the side bar 66 of the other photovoltaic module 30. Thus, the photovoltaic modules laid adjacent have their metal frames electrically connected to each other. The male connection terminal 98 can be inserted into the female connection terminal 100, by a single manual operation. This enhances the efficiency of electrically connecting the metal frames of the photovoltaic modules 30.

To represent the electrical connection between any adjacent photovoltaic modules 30, the photovoltaic module 30 being secured is shown in FIG. 13 as if already electrically connected to the photovoltaic module 30 that has been secured. In practice, however, the modules 30 are secured in the procedure described above. The electric wires 94 and 95 may be long enough not to hinder the laying and securing the modules. In this case, the wires 94 and 95 may be connected to each other before the photovoltaic module 30 is secured beside the photovoltaic module 30 already secured to the roof.

In the second embodiment, the left side bar 65 and the right side bar 66, both made by extrusion using the same mold, are arranged symmetrically with respect to a point. Further, the electric wires 94 and 95 having almost the same length are arranged symmetrically with respect to that point. The side bars 65 and 66 can, therefore, have holes at the same position, into which the screws 96 and 97 will be driven. Thus, the side bars 65 and 66 can be inventory-controlled in the same manner. This also serves to reduce the cost.

Furthermore, the male and female connection terminals 94 and 100 can be connected to the middle parts of the side bars 65 and 66, because the electric wires 94 and 95 that have almost the same length extend along the upper part of the bar 65 and the lower part of the bar 66, respectively. This shortens the distance for which the electric wires 94 and 100 hang down after they are connected, though the wires 94 and 100 are rather long to facilitate the connection.

As indicated above, each photovoltaic module 30 is moved in the direction of arrow to the photovoltaic module 30 already secured to the roof. As the photovoltaic module 30 is so moved, its side bar 65 may abut on the side bar 66 of the photovoltaic module 30 already secured.

The shock generated by the abutment can be buffered as the spacers 69 that are bonded to the side bars 65 and 65 undergo elastic deformation. The shock on the module body 61 of the photovoltaic module 30 already secured can, therefore, be attenuated.

Once the solar-power generating apparatus 25 has been installed, the spacers 69 is positioned between the photovoltaic modules 30 laid adjacent to one another in the transverse direction of the roof 21, as is illustrated in FIG. 11. A gap G corresponding to the thickness of the spacers 69 is provided between any two adjacent modules 30. Thanks to the gap G and the elastic deformation of the spacers 69, the module body 61 receives no extra load that may otherwise be applied when the photovoltaic module 30 expands as it is heated with solar heat. This prevents the module body 61 from receiving the load resulting from the thermal expansion of the module 30. The spacers 69 provide the gaps G naturally as the photovoltaic modules are laid one after another. No particular work needs to be performed to space the modules 30 apart from one another. This is advantageous, saving labor in laying the photovoltaic modules.

The photovoltaic modules 30, which are considerably heavy, may be positioned, each with its side bar 65 or 66 facing the floor in the factory or on the ground at the construction site. In this case, too, the spacers 69 bonded to the bars 65 and 66 elastically deform, buffering or reducing the shock that the photovoltaic modules 30 receive when they are placed on the floor or the ground. This prevents the module body 61 from receiving the shock.

In the factory or at the construction site, each photovoltaic module 30 may be handled, with the electric wires 94 and 95 held on the back of the module body 61. The photovoltaic module 30 thus handled may be placed on a mounting surface H, with the side bar 65 or 66 facing the surface H as indicated by the two-dot, dashed lines in FIG. 12A. In this condition, the spacers 69 bonded to the side bar, for example the side bar 66, prevents the side bar 66 from contacting the mounting surface H. This is because the spacers 69 are sufficiently thick. Space apart from the mounting surface H, the bar 66 will not have its surface damaged even if the photovoltaic module 30 is dragged in said condition.

As mentioned above, the spacers 69 can reduce the load that is exerted on the module body 61 as the photovoltaic module 30 is being laid on the roof or when it undergoes a thermal expansion after laid on the roof. Further, the spacers 69 prevent the side bars 65 and 66 from being damaged as they slide on the mounting surface H. Note that the side bars 65 and 66 have spacers 69 on only their end parts. Thus, the spacers 69 need not be used in so great numbers as in the case where they are bonded to other parts of each side bar, too.

The third embodiment of this invention will be described, with reference to FIGS. 14 to 18. The third embodiment is identical in basic structure to the second embodiment. The components similar or identical to those of the second embodiment will be designated at the same reference numerals and will not be described below. Only the structural features different from the second embodiment will be described. The third embodiment differs from the second in that a support device 111 is used to support a solar-power generating apparatus.

The support device 111 comprises a plurality of rail-shaped longitudinal bars 112 and a plurality of rail-shaped transverse bars 113. Each longitudinal bar 112 extends in the longitudinal direction (i.e., direction in which the slated-roof 21 slopes upwards from the eaves to the ridge) and secured to the roof 21. It is used as a support base. Each transverse bar 113 is coupled to the longitudinal bars 112 and used as a support member. Each longitudinal bar 112 and each transverse bar 113 cross each other and coupled to each other at intersection. The longitudinal bars 112 and the transverse bars 113 are bars that are made of aluminum alloy and formed by extrusion.

Each transverse bar 113 is laid, extending in the transverse direction of the roof 21 (i.e., direction perpendicular to the direction in which the roof 21 slopes upwards from the eaves to the ridge). Each transverse bar 113 comprises a plurality of support-bar elements 113a (see FIG. 15) and couplings 114. The elements 113a are arranged in a line and connected together by the couplers 114. The transverse bars 113 are laid parallel to one another. The bars 113 are spaced apart in the direction the roof 21 slopes, by a distance that is equal to the length of the photovoltaic modules 30.

The two transverse bars 113 that lie close to the ridge and eaves of the roof, respectively, are called "end rails." The other transverse bars 113 that lie between the end rails are called "intermediate rails." Of any two transverse bars that are arranged adjacent in the direction the roof slopes, the one closer to the ridge is called "ridge-side transverse bar," and the other closer to the eaves is called "eaves-side transverse bar."

As shown in FIGS. 15 and 16, each longitudinal bar 112 has two grooves 121 and one groove 122. The grooves 121 open in the left and right sides, respectively. The groove 122 opens in the flat upper wall 112e. The grooves 121 and 122 extend over the entire length of the longitudinal bar 112. The grooves 121 and 122 have such a cross section that the bottom is broader than the opening 121a or 122a.

Figure 16A:
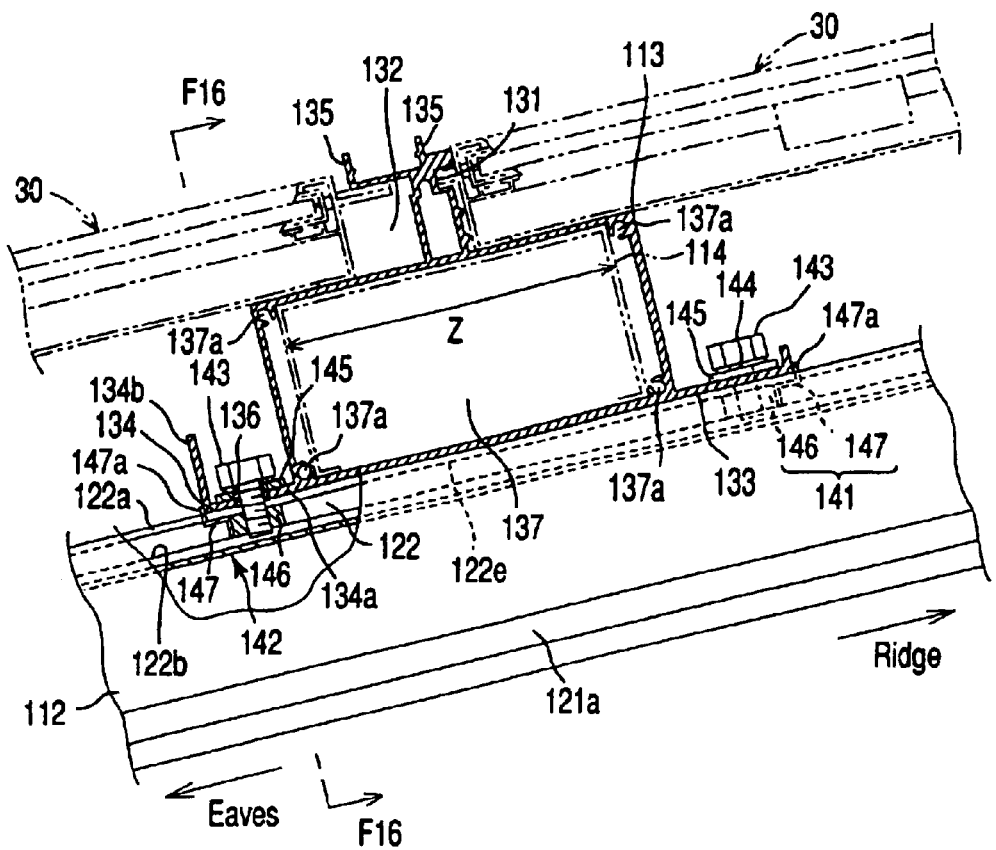
FIG. 16A is a partially cross-sectional view of the support device of the solar-power generating apparatus of FIG. 14.
Figure 16B:
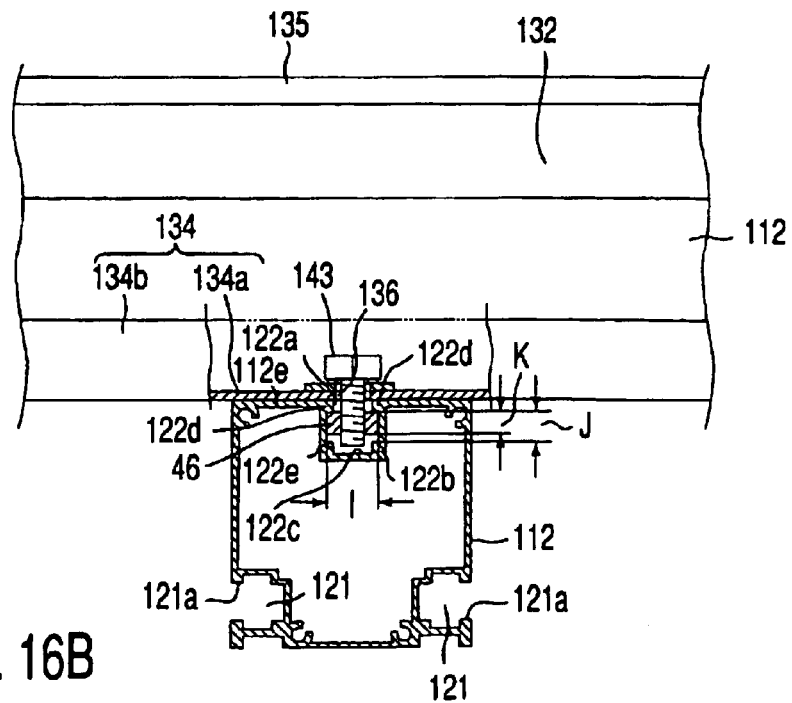
FIG. 16B is a cross-sectional view taken along line F16—F16 shown in FIG.

The grooves 121 and 122 diverge, each from the opening toward the bottom at both sides that extend from the longer sides of the opening 121a or 122a. Instead, they may diverge at only one side. The bottom of the groove 122 defines a recess 122c that is narrowed by steps 122b. The recess 122c opposes the opening 122a. In FIG. 16B, the reference numeral 122d denotes the lateral edges of the opening 122a (also called "opening edges"). The distance J between either edge and the step 122b is larger than the thickness K of polygonal nuts that will be described later. The grooves 121 are similar to the groove 122 in structure.

Each longitudinal bar 112 is coupled to a plurality of metal supports 123 by bolts 124 and polygonal nuts, or square nuts 125. As shown in FIG. 15, each metal support 123 comprises a base plate 126 and a longitudinal-bar holding plate 127. The base plate 126 is fastened to the roof 21 by screws. The longitudinal-bar holding plate 127 is riveted to the upper surface of the base plate 126. The holding plate 127 has two side walls that oppose each other. Each side wall has a bolt hole 127a that is elongated in vertical direction.

The longitudinal bar 112 is fastened to the metal support 123, with its lower part held between the side walls of the longitudinal-bar holding plate 127 by tightening the square nuts 125 on the bolt 124. That is, the square nuts 125 are inserted into in the grooves 121 through the openings thereof. They are set in the grooves 121, each unable to rotate. The bolt 124 is inserted in the square nuts 125, passing through the bolt holes 127a and the openings of the grooves 121. When the bolt 124 is tightened, the longitudinal bar 112 is secured to the metal support 123. Thus secured, the longitudinal bar 112 inclines down toward the eaves of the roof 21. In FIG. 15, the reference numeral 128 designates spring washers and the reference numeral 129 denotes washers. The spring washers 128 are mounted on the bolt 124. The washers 129 disperse the tightening load.

The transverse bars 113 are identical in structure. As FIG. 16A illustrates, each transverse bar 113 has an up-open groove 131, a down-open groove 132, a pair of flanges 133 and 134, and a pair of member-holding portions 135. The flanges 133 and 134 are positioned below the grooves 131 and 132. The member-holding portions 135 lie above the grooves 131 and 132. The up-open groove 131 is equivalent to the up-open grooves 45 and 52, both described in conjunction with the second embodiment. The down-open grooves 132 are equivalent to the down-open grooves 41 and 51, both described in conjunction with the second embodiment. The flanges 133 and 134 correspond to the flanges 42, 46 and 53, all described in conjunction with the second embodiment. The member-holding portions 135 are equivalent to the member-holding portions 43, 47 and 54, all described in conjunction with the second embodiment.

Once the transverse bar 113 is laid on the roof 21, the down-open groove 132 opens downwards, sloping down toward the eaves of the roof 21. The up-open groove 132 opens upwards, sloping up toward the ridge of the roof 21. Both grooves 131 and 132, both flanges 133 and 134, and the member-holding portions 135 continuously extend in the lengthwise direction of the transverse bar 113.

The flanges 133 and 134, which are the sides of the transverse bar 113, project from the lower edge of the transverse bar 113. The eaves-side flange 134 has a base part 134a and an up-open edge part 134b. The base part 134a contacts the upper surface of the longitudinal bar 112. The edge part 134b is bent and extends from the distal end of the base part 134a. The eaves-side base part 134a has a groove that opens upwards. This groove holds an output cable (not shown), which is led from the photovoltaic module 30.

The flanges 133 and 134 have connection holes 132 each, which are made in that part of each flange that contacts the upper surface of the longitudinal bar 112. In other words, both edges of the longitudinal bar 112 have connection holes 136. Usually the connection holes 136 are made by those who install the solar-power generating apparatus. Nonetheless, they may be made before the apparatus is installed on the roof 21. If this is the case, the connection holes 136 may be elongated ones that extend in the lengthwise direction of the transverse bar 113.

The transverse rail 113 that functions as a ridge-side end rail is identical in structure to the transverse bar 113 that functions as an intermediate rail. Though not shown, the transverse bar 113 functioning as a ridge-side end rail has a down-open groove, a pair of flanges, and a pair of member-holding portions. Once the bar 113 is secured on the roof 21, the down-open groove downwards and slantwise, the flanges lie below the down-open groove, and the member-holding portions lie above the down-open groove. The down-open groove of the transverse bar 113 has the same structure as the transverse bar 113 that serves as an intermediate rail, and will be designated, when necessary, at reference numeral 132. Similarly, the transverse bar 113 functioning as an end rail has the same structure as the transverse bar 113 functioning as an intermediate rail. Thus, the transverse bar 113 has an up-open groove, a pair of flanges and a pair of member-holding portion. Once the bar 113 is secured on the roof 21, the groove (not shown) opens upwards and slantwise, the flanges (not shown) lie below the groove, and the member-holding portions (not shown) lie above the groove. The up-open groove has the same structure as the up-open groove 131 of the transverse bar 113 that works as an intermediate rail, and will be designated, when necessary, at reference numeral 131.

The flanges of the transverse rails 113 that are the ridge-side end rail and the eaves-side end rail, respectively, are identical in structure to the flanges 133 and 134 of the other transverse bars 113 that function as intermediate rails. Thus, the flanges will be designated, when necessary, at the reference numerals 133 and 134. Similarly, the member-holding portions of the transverse rails 113 that are the ridge-side end rail and the eaves-side end rail, respectively, are identical in structure to the member-holding portions 135 of the other transverse bars 113 that function as intermediate rails. Therefore, the member-holding portions will be denoted, when necessary, at the reference numeral 135. The member-holding portions 135 extend upwards, each having claw-holding parts.

The elements 113a of each transverse bar 113 have a hollow part 137 each. The hollow part 137 extends in the lengthwise direction of the element 113a. Any two transverse-bar elements 113a arranged adjacent in the lengthwise direction are connected together by the couplers 114 that are arranged along the hollow parts 137. The couplers 114 are bars made of aluminum allow and formed by extrusion.

As FIG. 15 shows, each coupler 114 has two side walls 114a, a top wall 114b, and two lower walls 114c. The top wall 114b connects the side walls 114a at their upper edges. The lower walls 114c extend from the lower edges of the side walls 114a, respectively, at right angles thereto, and approach each other. The height of the coupler 114, or the distance between the outer surface of the top wall 114b and the outer surface of either lower wall 114c, is almost the same as the height of the hollow part 137. The width of the coupler 114, or the distance between the outer surfaces of the side walls 114a, is almost equal to the distance Z between the tapping holes 137a that are cut, as shown in FIG. 16A, in the four corners of the hollow part 137.

One end of a coupler 114 is fitted in the hollow part 137 of one of two adjacent transverse-bar element 113a. The end of the coupler 114 is fitted in the hollow part 137 of the other transverse-bar element 113a. Having its ends so fitted, the coupler 114 connects the adjacent transverse-bar elements 113a and inhibits the elements 113a from moving toward the ridge or eaves of the roof.

Any longitudinal bar 112 intersects with all transverse bars 113 at right angles are coupled to the transverse bars 113 at the intersection. The bars 112 and 113 are coupled by using the groove 122 of the bar 112, a pair of bolt-holding bodies 141 and 142, a bolt 143, a spring washer 144, and a washer 145. The washer 144 prevents the bolt 143 from loosening. The washer 145 disperses the tightening load on the bolt 143.

Figure 17:
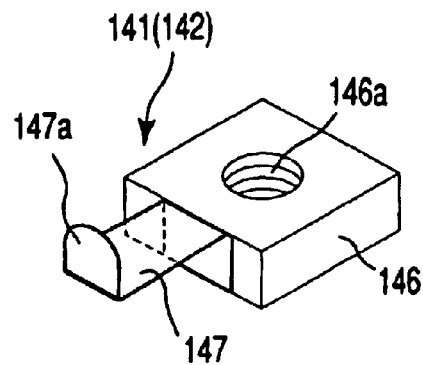
FIG. 17 is a perspective view of a bolt receptacle that the support device of FIG. 15 has.
Figure 18:
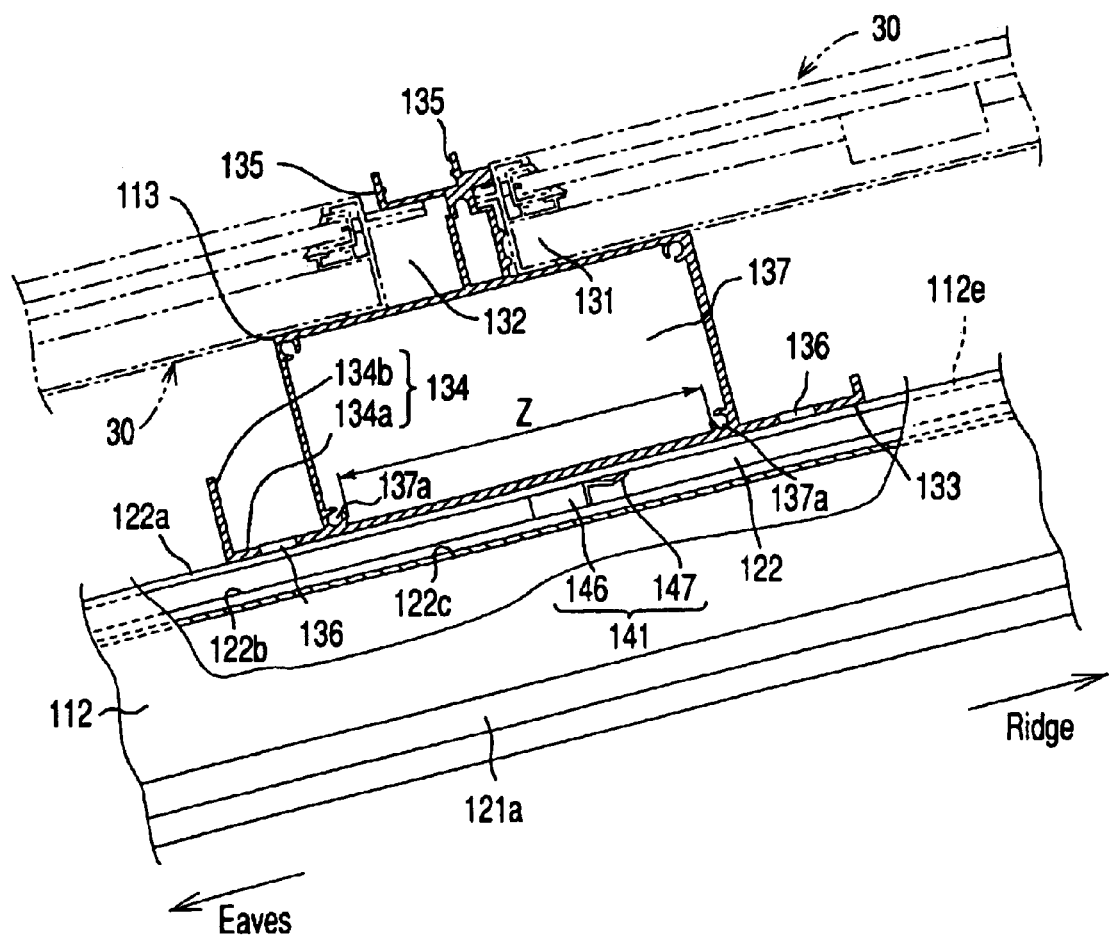
FIG. 18 is a cross-sectional view of the crossing section of the support member used in the solar-power generating apparatus of FIG. 14, explaining how the bolt receptacle is embedded in this section.

The bolt-holding bodies 141 and 142 are identical in structure. They are loosely fitted in the groove 122 and can move in the lengthwise direction of the groove 122. As FIG. 17 shows, the bold-holding bodies 141 and 142 comprise a polygonal nut 146 and a projection 147 each.

The polygonal nut 146 is square. It has one screw hole 146a. The four sides of the polygonal nut 146 are a little broader than the bottom of the groove 122 that has a width I as illustrated in FIG. 16A. This enables the bolt-holding bodies 141 and 142 to rotate freely in the groove 122. The polygonal nut 146 has a thickness K, which is smaller than the distance J between the step 122b and either opening edge 122d of the groove 122 shown in FIG. 16A.

The projection 147 is a ribbon-shaped metal strip that has a width narrower than that of the opening 112a. It can deform and preferably has flexibility. The projection 147 is secured at one end to one side of the polygonal nut 146 by means of adhesion, welding or the like. The other end of the projection 147 is bent, forming an upright end-portion 147a. The upright end-portion 147a has such a length that it slightly protrudes from the opening 122a while the bold-holding body 141 or 142. If necessary, the projection 147 is pushed into the groove 112. The upright end-portion 147a can catch the flange 133 or 134.

The bolt-holding bodies 141 and 142 are inserted into the groove 122 of the longitudinal bar 112 laid on the roof 21, through either the ridge-side open end or eaves-side open end of the bar 112. The eaves-side bolt-holding body 141 is inserted into the groove 122, with its projection 147 toward to the eaves of the roof.

The bolt-holding bodies 141 and 142 thus inserted are moved in the groove 122 to positions where they will be coupled to the transverse bars 113. While the bodies 141 and 142 are so moved, their screw holes 146a are aligned, respectively, with the connection holes 136 of the ridge-side flange 133 and eaves-side flange 134 of the transverse bar 113. In this condition, the bolt 143, having the spring washer 144 and the washer 145 mounted on it, is driven into the screw hole 146a from above, passing through the connection hole 136 and the opening 122a of the groove 122 that lie beneath the connection hole 136. In this case, the polygonal nut 146 abuts on the inner surface of the groove 122. The nut 146 therefore prevents the bolt-holding body 141 or 142 from rotating.

As the bolts 143 are tightened, the polygonal nuts 146 of the bolt-holding bodies 141 and 142 are coupled to the transverse bar 113, clamping the lateral edges of the opening 122a. As a result, the transverse bar 113 is coupled to the longitudinal bar 112. The longitudinal bar 112 and the transverse bar 113 are coupled by performing this assembling procedure, as is illustrated in FIGS. 16A and 16B.

In the assembling procedure described above, the bolt-holding bodies 141 and 142 are moved in the groove 122, with the upright end-portions 147a of their projections 147 protruding from the opening 122a of the groove 122. Therefore, the upright end-portion 147a abuts on the flange 133 or 134 of the transverse bar 113 when either bolt-holding body (141 or 142) reaches the intersection of the longitudinal bar 112 and the transverse bar 113. At this time, the screw hole 146a of each polygonal nut 146 is roughly aligned with the connection hole 136 of the flange 133 or 134.

Thereafter, the upright end-portion 147a may be pinched with fingers, thereby minutely adjusting the position of each bold-holding body 141 or 142. The screw hole 146a is thereby aligned with the connection hole 136. In this condition, the bolt 143 is inserted from above, and can then be tightened. Thus, the bars 112 and 113 can be easily coupled at the intersection.

When the bolt-holding bodies 141 and 142 along the groove 122 as described above, the transverse bar 113 loosely or tightly held by bolts may hinder the moving of the bodies 141 and 142. If this is the case, the upright end-portions 147a, which lie on the transverse bar 113 loosely held, may be pushed into the groove 122 to a level below the upper surface of the longitudinal bar 112. Then, it is easy to release the projection 147 of the bold-holding body 141 or 142 from the transverse bar 113. At this time, the projection 147 is deformed or preferably elastically deformed, or the polygonal nut 146 is inclined since the bolt-holding body 141 or 142 is loosely fitted in the groove 122.

The bolt-holding bodies 141 and 142 are thereafter pushed and moved along the groove 122 with a rod-shaped tool, such as a screw driver, inserted into the groove 122 through the opening 122a. As a result, a bold-holding body 141, for example, can be passed under the transverse bar 113 as is displayed in FIG. 18. Bolt-holding bodies 141 and 142 can therefore be moved to the next position where the bars 112 and 113 are to be coupled, without necessity of lifting the transverse bar 113.

In the case where each transverse bar 113 is composed of transverse-bar elements 113a that are connected by couplers 114, the support device 111 is assembled when the transverse-bar elements 113a are connected. Consequently, any coupler 114 holding two adjacent elements 113a at their one end inhibits the elements 113a from moving when the support device 111 are lifted not to prevent the bolt-holding bodies 141 and 142 from moving. It is inevitably difficult to lift the transverse-bar element 113a. Nevertheless, the above-mentioned inconvenience resulting from the use of the couplers 114 is eliminated because the bolt-holding bodies 141 and 142 can be passed under the transverse bars 113, without necessity of lifting these bars 113. The support device 111 can therefore be assembled with ease.

As specified above, the support device 111 is assembled by first driving bolts 143, from above, at the intersections of the longitudinal bars 112 and transverse bars 113 and then tightening the bolds 143. In addition, it does not take time to lift the transverse bars 113 from the longitudinal bars 112 in order to move the bolt-holding bodies 141 and 142 to the intersections at which the bolts are tightened. Hence, the support device 111 can be assembled with high efficiency. This enhances the efficiency of installing the solar-power generating apparatus 25 on the roof 21.

The photovoltaic modules 30 are laid and secured in the procedure described above, each between a ridge-side transverse bar of the support device 111 and the adjacent eaves-side transverse bar thereof. The procedure of securing the modules is just the same as in the second embodiment.

Figure 19:
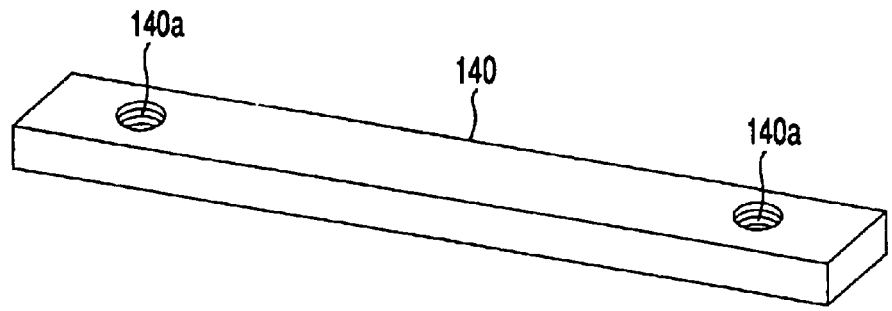
FIG. 19 is a perspective view showing of a bolt receptacle of the support device used in a solar-power generating apparatus according to a fourth embodiment of the invention.

The fourth embodiment of the invention will be described, with reference to FIG. 19 and FIG. 20. The fourth embodiment is basically the same as the third embodiment. The components identical or similar to those of the third embodiment will be designated at the same reference numerals and will not be described. The bolt-holding bodies 140 that differ from their equivalents of the third embodiment will be described below.

Each bolt-holding body 140 is made of aluminum alloy. As seen from FIG. 19, it is a bar that has the same width as the transverse bars 113 and a length equal to or larger than that of the bars 113. The bolt-holding body 140 has two screw holes 140a, each in one end portion. The screw holes 140a are through holes, extending in the direction of thickness of the bolt-holding body 140. They will be aligned with the connection holes 136a cut in the flanges 133 and 134 of a transverse bar 113.

The bolt-holding body 140 is a little narrower than the bottom wall of the groove 122. Its thickness is slightly smaller than the distance J between the opening edges 122d and step 122c of the groove 122. The bolt-holding body 140 lies in the groove 122 of the longitudinal bar 112 and can move in the groove 122.

The bolt-holding body 140 is used, arranged beneath the transverse bar 113. It is positioned beneath the bar 113, by inserting a tool, such as a screw driver, into the opening of the groove 122 at the eaves-side of the transverse bar 113 to be secured and by using the tool as a stopper. The bolt-holding body 140 may have a strip (not shown), which projects from one end, as in the third embodiment.

Figure 20:
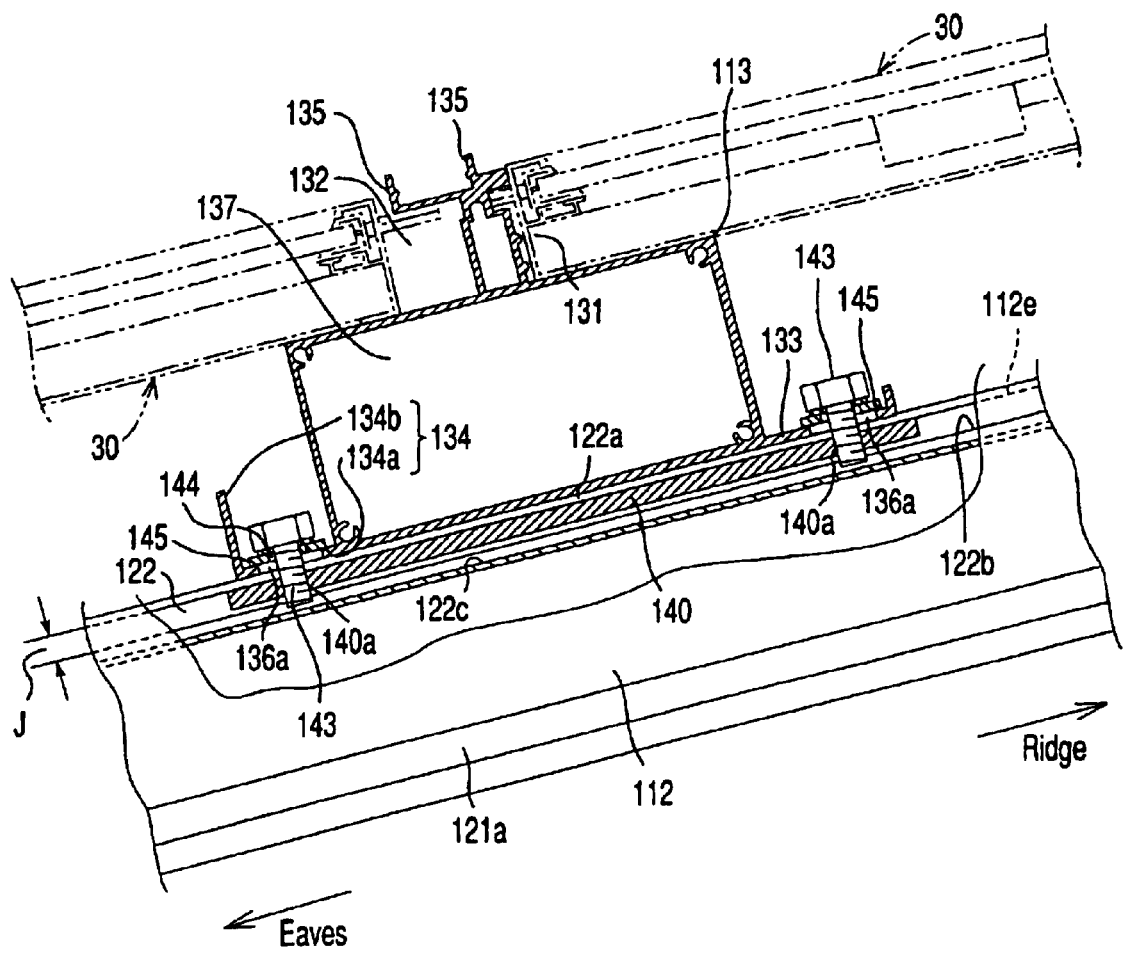
FIG. 20 is a cross-sectional view of the crossing section of the support member used in the solar-power generating apparatus of FIG. 19.

As FIG. 20 shows, the connection holes 136a made in the transverse bar 113 may preferably elongated holes that extend in he widthwise direction of the bar 113. In this case, it does not matter if the screw holes 140a somewhat deviate from the design positions. This achieves the advantage that the longitudinal bar 112 and the transverse bar 113 can be fastened together at their intersection when the bolts 143 driven into the intersection from above are tightened. The fourth embodiment is identical to the third, in all other structural aspects including the aspects that are not shown in FIG. 19 or FIG. 20.

In the fourth embodiment, too, the longitudinal bar 112 and the transverse bar 113 can be fastened from above at their intersection by bolts. Since each bolt-holding body 140 can pass under the transverse bar 113. It is therefore unnecessary to lift the transverse bar 113 in the course of assembling the support device. Moreover, both screw holes 140a made in the bolt-holding body 140 can be aligned at a time with the two connection holes 136a of the transverse bar 113 in the fourth embodiment.

The fifth embodiment of this invention will be described, with reference to FIG. 21 and FIG. 22. The fifth embodiment is basically the same as the third embodiment. The components identical or similar to those of the third embodiment will be designated at the same reference numerals and will not be described. The bolt-holding bodies 241 that differ from their equivalents of the third embodiment will be described below.

Figure 21:
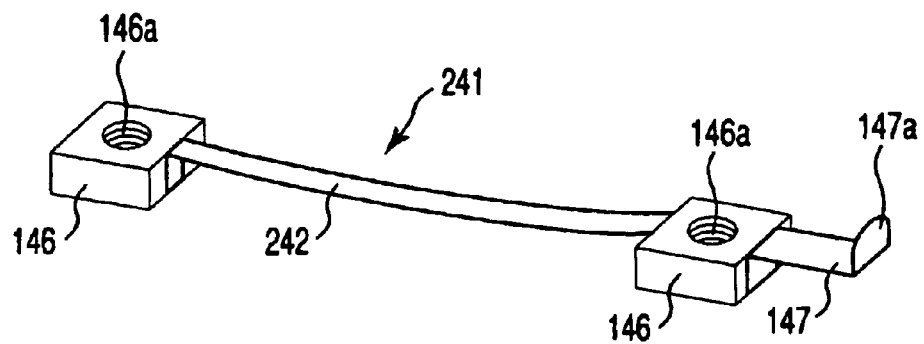
FIG. 21 is a perspective view showing of a bolt receptacle of the support device used in a solar-power generating apparatus according to a fifth embodiment of the present invention.
Figure 22:
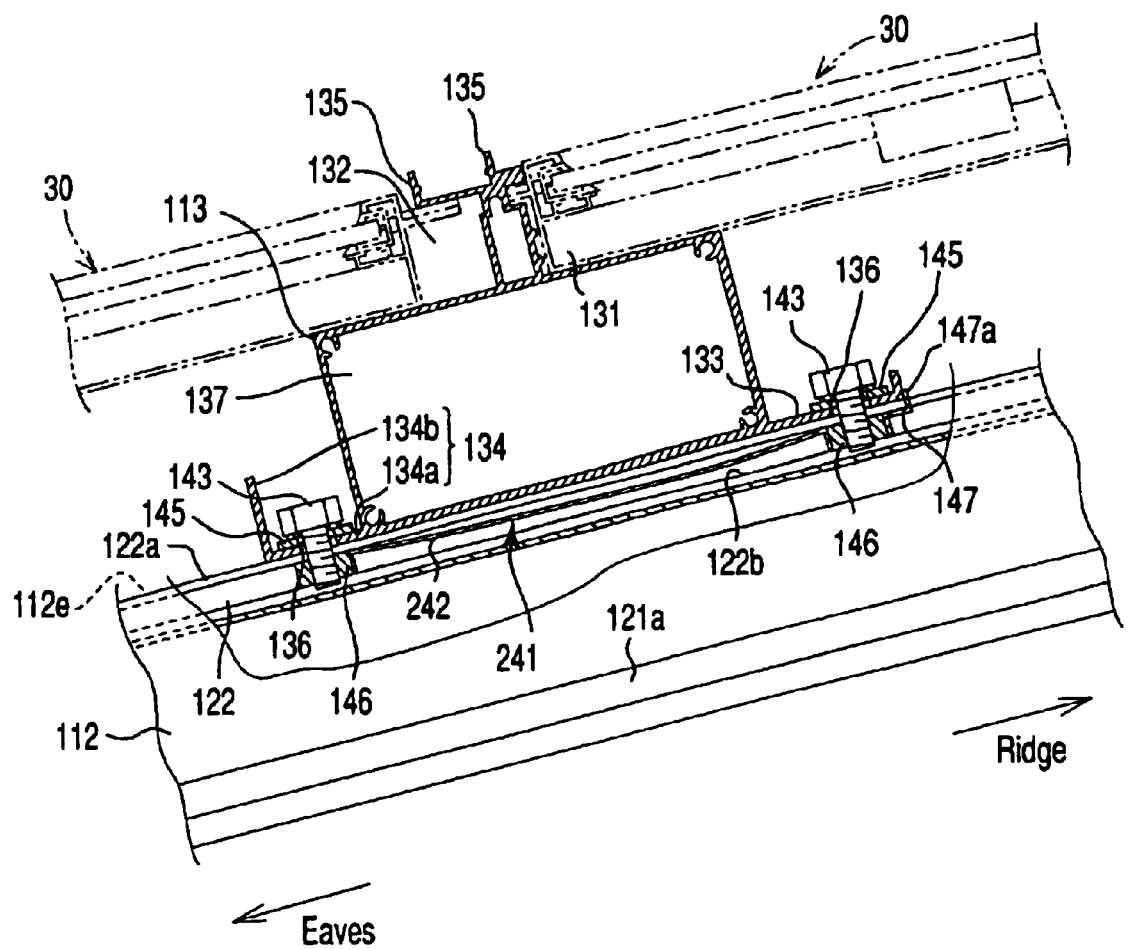
FIG. 22 is a partially cross-sectional view of the crossing section of the support member used in the solar-power generating apparatus shown in FIG. 21.

As FIG. 21 illustrates, each bolt-holding body 241 comprises a pair of polygonal nuts 146, a connection part 242, and a projection 147. The polygonal nuts 146 have one screw hole 146a each. The connection part 242 extends between the nuts 146 and connects them together. The projection 147 protrudes from one of the nuts 146. The connection part 242 is a flexible lender member such as a wire, a metal ribbon or the like. The connection part 242 curves, for example, downwards. Being flexible, it can be deformed, further bent or straightened up. Thus, the distance between the screw holes 146a of the polygonal nuts 146 can be adjusted to the distance between the connection holes 136 made in the transverse bar 113. The fifth embodiment is identical to the third, in all other structural aspects including the aspects that are not shown in FIG. 21 or FIG. 22.

Hence, the longitudinal bars 112 and the transverse bars 113 can be coupled together also in the fifth embodiment, by inserting bolts from above into the intersections of the bars and by tightening the bolts. Furthermore, the bolt-holding bodies 241 can be passed under the transverse bars 113 to assemble the support device, without the necessity of lifting the longitudinal bars 113 already laid. In the fifth embodiment, each bolt-holding body 241 has a pair of screw holes 146a. The screw holes 146a can be aligned with the two connection holes 136 of the transverse bar 113, which are spaced apart in the widthwise direction of the bar 113. This further increases the efficiency of assembling the support device.

The sixth embodiment of this invention will be described, with reference to FIG. 23 to FIG. 25. The sixth embodiment is basically the same as the third embodiment. The components identical or similar to those of the third embodiment will be designated at the same reference numerals and will not be described. The sixth embodiment differs from the third embodiment in that the longitudinal bars 112 and the transverse bars 113 are coupled by support-holding members 261.

Figure 23:
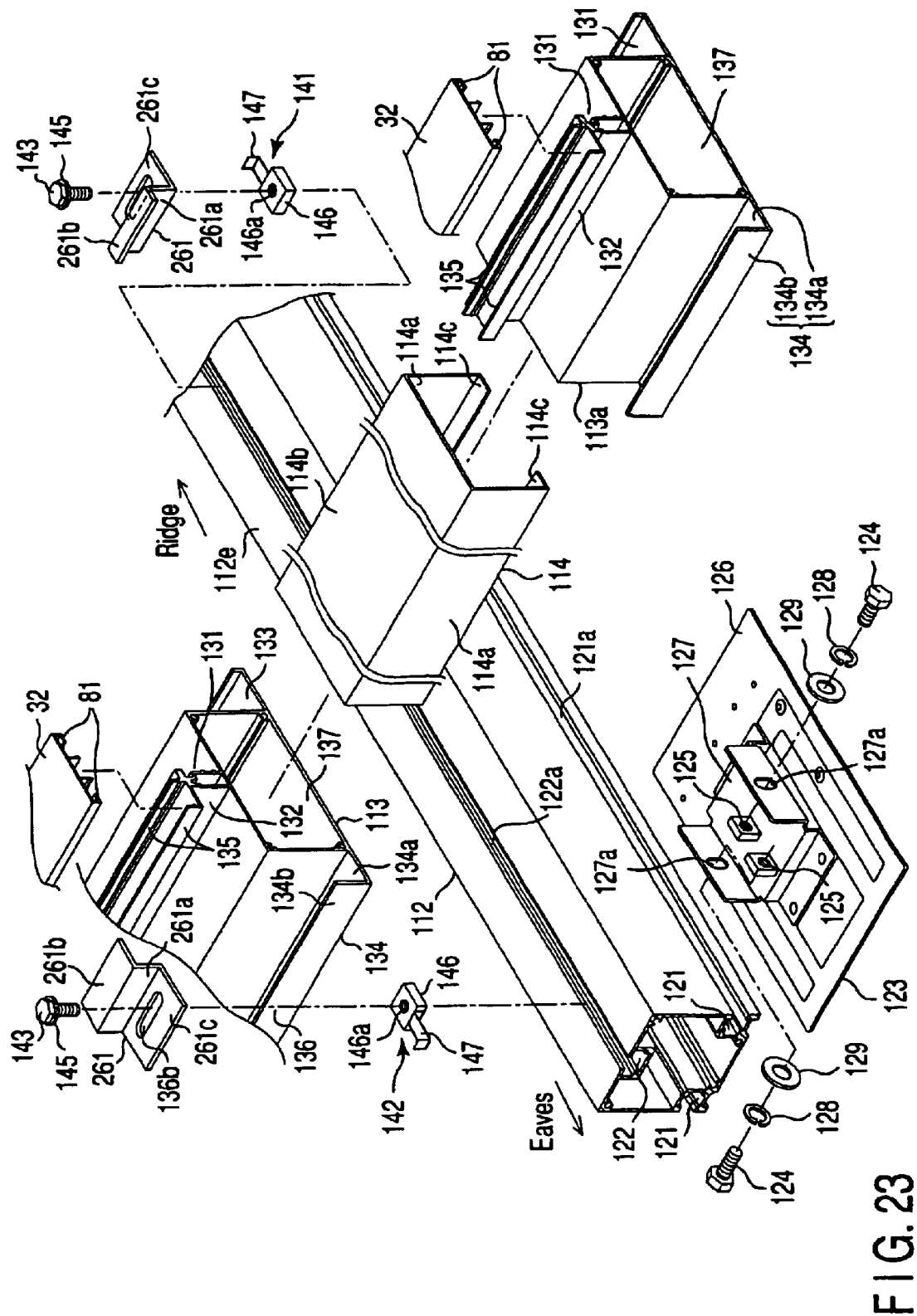
FIG. 23 is a perspective view of the support device of a solar-power generating apparatus according to a sixth embodiment of the invention, illustrating some parts separated from other parts of the support member.
Figure 24A:
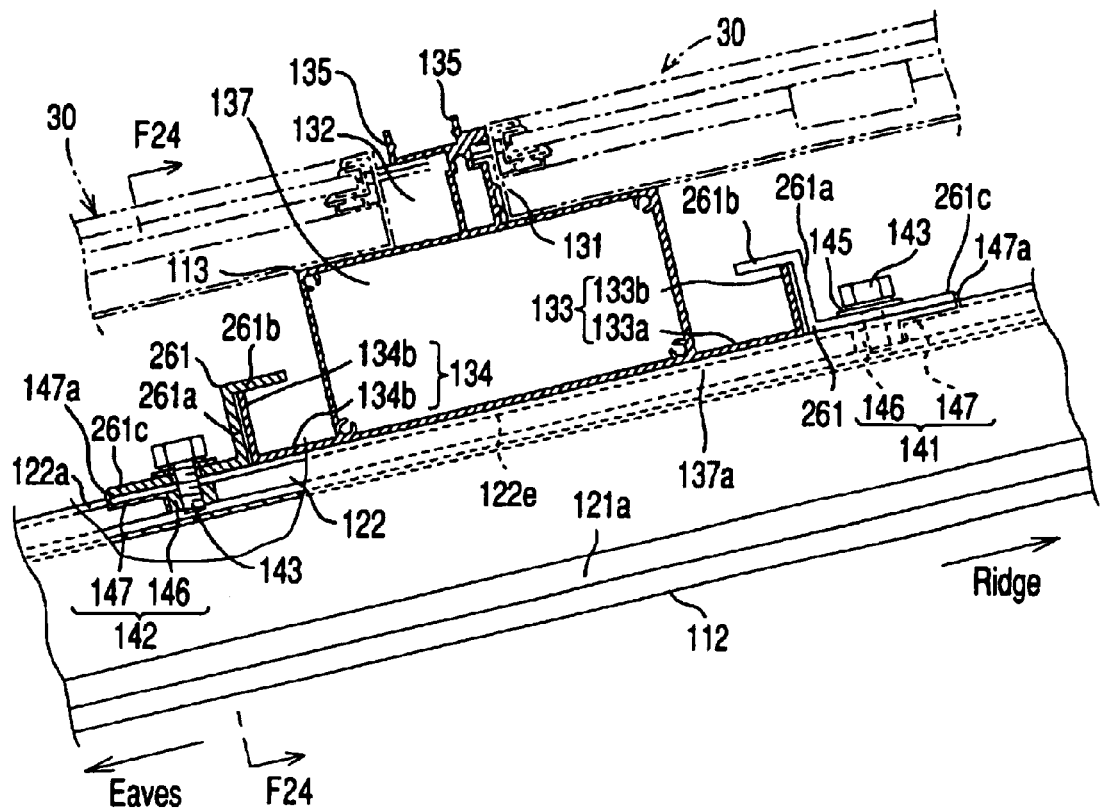
FIG. 24A is a cross-sectional view of the crossing section of the support member used in the solar-power generating apparatus of FIG. 23.
Figure 24B:
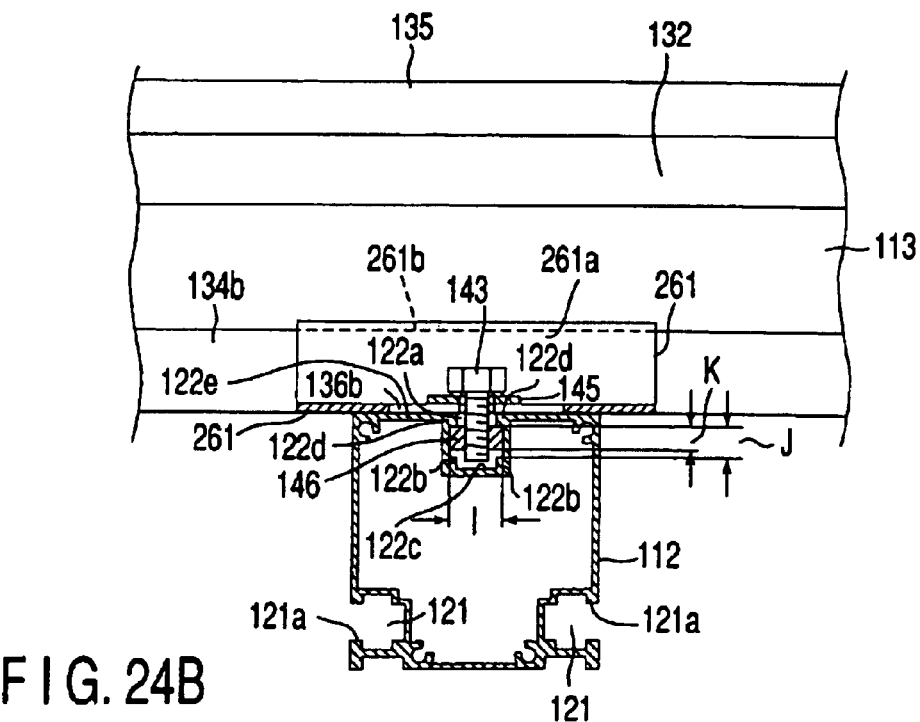
FIG. 24B is a cross-sectional view taken along line F24—F24 shown in FIG. 24A.

As FIG. 23 and FIG. 24A show, the ridge-side flange 133 of each transverse bar 113 has a base part 133a and an upright edge part 133b. The base part 113a contacts the upper surface of the longitudinal bar 112. The upright edge part 133b is bent and extends from the distal end of the base part 133a. The support-holding members 261 are metal plates or the like. As seen from FIG. 25 etc., each support-holding member 261 has been made by first bending a plate upwards, forming an upright part 261a and a base part 261c, and then bending the upper portion of the upright part 261a horizontally, forming a holding part 261b.

The upright part 261a has a height equal to or a little smaller than the height of the upright edge parts 133b and 134b. The holding part 261b holds the upper edge of the upright edge part 133b or 134b while the upright part 261a remains contacting the upright edge part 133b or 134b. The base part 261c that is supported on the upper surface of the longitudinal bar 112 is bent in the direction opposite to the direction the holding part 261b is bent. The base part 261c has a connection hole 136b. As FIG. 25 depicts, the connection hole 136b is an elongated hole that extends in the lengthwise direction of the transverse bar 113. Being elongated, the hole 136b facilitates the positioning of the support-holding member 261. The sixth embodiment is identical to the third, in all other structural aspects including those not shown in FIG. 23 to FIG. 25.

In the sixth embodiment, the longitudinal bars 112 and the transverse bar 113 are coupled together, at each intersection, in the sequence of steps described below.

First, support-holding members 261 are laid from above, at each intersection of the longitudinal bars 112 and transverse bars 113. More precisely, each member 261 is positioned, with its holding part 261b laid on the ridge-side upright edge part 133b or eaves-side upright edge part 134b and with its base part 261c mounted on the upper surface of the longitudinal bar 112.

Next, the bolt-holding bodies 141 and 142 are laid in the groove 112 of the longitudinal bar 112. The bodies 141 and 142 are moved in the groove 122 until the upright end-portions 147a of their projections 147 are held by the base parts 261c. Thus, the screw holes 146a of the polygonal nuts 146 are roughly aligned with the connection holes 136b of the base parts 261c. In this condition, the bolt-holding bodies 141 and 142 are adjusted in position, aligning the screw holes 146a with the connection holes 136b as is desired.

Thereafter, bolts 143 are inserted, from above, through the connection holes 136b of the support-holding members 261. The bolts are then driven into the screw holes 146a of the bolt-holding bodies 141 and 142.

The opening edge 122d of the groove 122 of the longitudinal bar 112 is thereby held between the bolt-holding body 141 or 142 and the base part 261c of the support-holding member 261. The flange 133 or 134 of the transverse bar 113 is clamped between the holding part 261b of the support-holding member 261 and the longitudinal bar 112. As a result, the longitudinal bar 112 and the transverse bar 113 are coupled to each other.

In the sixth embodiment, too, the longitudinal bar 112 and the transverse bar 113 are coupled together by tightening the bolts from above at the intersection of these bars. Since the bolt-holding bodies 141 and 142 can be laid under the transverse bar 113, the transverse bar 113 already laid need not be lifted to assemble the support device.

As described above, the bolts 143 are passed through the support-holding member 261 clamped between the transverse bar 113 and the longitudinal bar 112, thereby to couple the bars 112 and 113 at their intersection. Hence, the transverse bar 113 need not have a connection hole through which the bolt 143 may pass. Thus, no connection holes need to be made in the bar 113 at the construction site. This helps to enhance the efficiency of work. Moreover, the strength of the intersection of the transverse bar 113 and the longitudinal bar 112 does not decrease as in the case where holes are made in the transverse bar. As a result, the longitudinal bar 112 and the transverse bar 113 are coupled more reliably than otherwise.

The seventh embodiment of the invention will be described, with reference to FIG. 26 to FIG. 30. The seventh embodiment is basically the same as the second embodiment. The components identical or similar to those of the second embodiment will be denoted at the same reference numerals and will not be described. The features that distinguish the seventh embodiment from the second embodiment will be explained. The seventh embodiment differs from the second embodiment in two respects. First, it has a support device 111 that supports the solar-power generating apparatus 25 on the slated roof 21. Second, it has cable-holding members 250 that hold the output cables of the photovoltaic modules 30.

The support device 111 comprises a plurality of rail-shaped longitudinal bars 112 and a plurality of rail-shaped transverse bars 212 to 215. The longitudinal bars 112 and the transverse bars 212 to 215 are coupled together. The longitudinal bars 112 and the transverse bars 212 to 215 are bars that are made of aluminum alloy and formed by extrusion. The longitudinal bars 112 are laid on the roof 21 and extend between the ridge and eaves of the roof 21. Each longitudinal bar 112 is used as a support base and fastened to the roof 21. Each longitudinal bar 112 is fastened to the roof 21 by screws or the like. The transverse bars 212 to 215 are used as support members. They cross the longitudinal bars 112 and extend in the transverse direction of the roof 21 (i.e., direction at right angles to the direction the roof 21 slopes). The transverse bars 212 to 215 that are parallel to one another and spaced apart in the direction the roof 21 slopes, at intervals that accord with the length of the photovoltaic modules 30.

Figure 27:
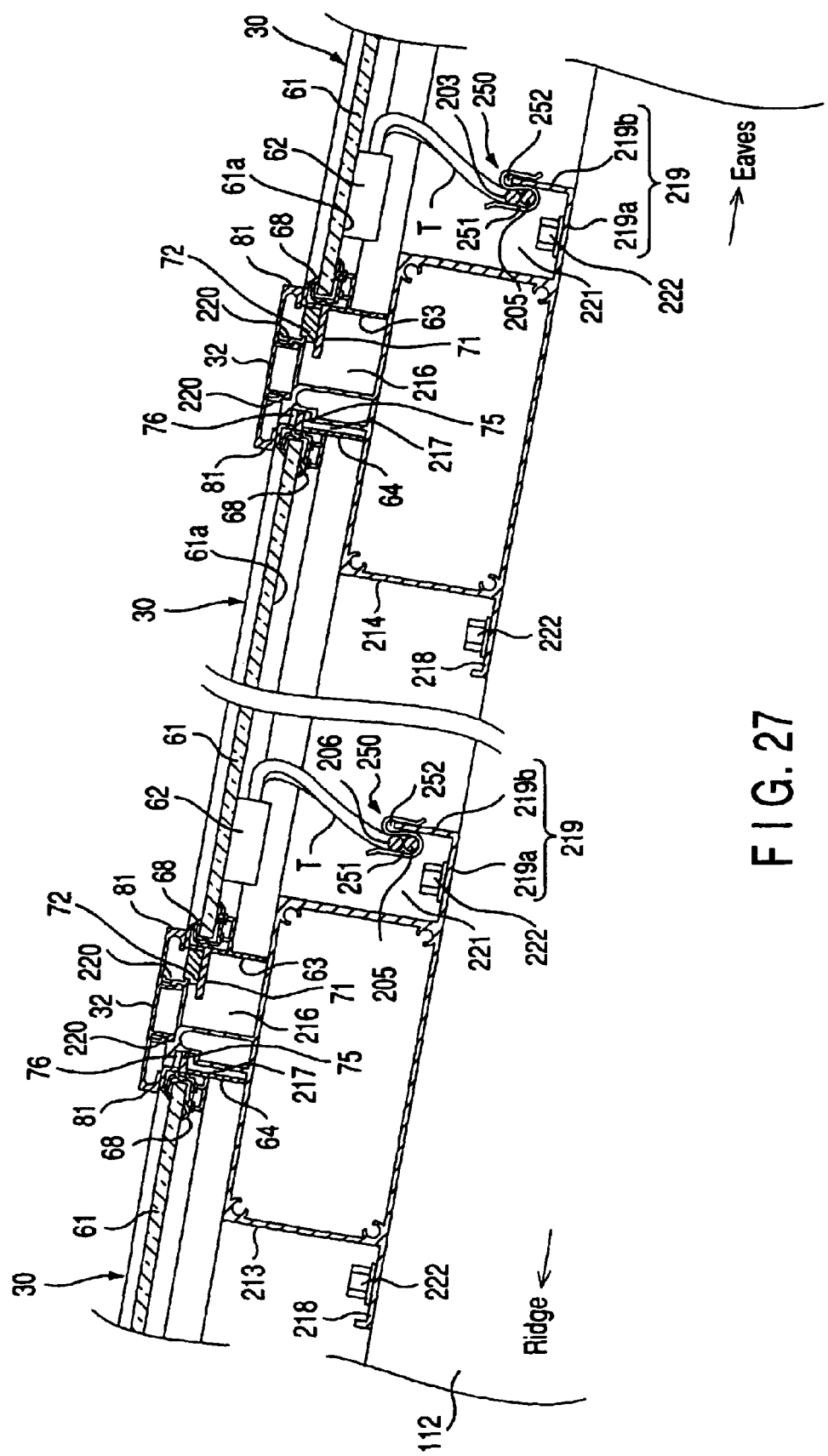
FIG. 27 is a cross-sectional view taken along line F27—F27 shown in FIG. 26.

The transverse bars 213 and 214, or intermediate rails, are laid between the transverse bars 212 and 215, which are end rails and laid nearer to the ridge and eaves of the roof 21, respectively, than any other transverse bars. The transverse bars 212 to 215 are identical in structure. As FIG. 27 shows, they have a down-open groove 216, an up-open groove 217, a pair of flanges 218 and 219, and a pair of member-holding portions 220. The flanges lie below the grooves 216 and 217. The member-holding portions lie above the grooves 216 and 217.

The up-open groove 217 is equivalent to the up-open grooves 45 and 52 described in connection with the second embodiment. The down-open groove 216 is equivalent to the down-open grooves 41 and 51 described in conjunction with the second embodiment. The flanges 218 and 219 correspond to the flanges 42, 46 and 53 explained in conjunction with the second embodiment. The member-holding portions 220 correspond to the member-holding portions 43, 47 and 54 that have been explained in conjunction with the second embodiment.

Once the transverse bars 212 to 215 are arranged on the roof 21, their down-open grooves 216 open toward the eaves of the roof, while their up-open grooves 217 open toward the ridge of the roof. The grooves 216 and 217, flanges 218 and 219 and member-holding portions 220 continuously extend in the lengthwise direction of the transverse bars 212 to 215.

The flanges 218 and 219 project from the lower lateral edges of the transverse bar 212 in the widthwise direction of the transverse bar 212. The eaves-side flange 219 has a base part 219a and an upright edge part 219b. In the transverse bars 212 to 215, a cable-holding groove 221 is defined between the lower, eaves-side wall and the eaves-side flange 219. The groove 221 opens upwards and extends in the lengthwise direction of the transverse bars 212 to 215.

The transverse bars 212 to 215 are coupled to the longitudinal bars 112 at the intersections of the right-side flanges 218 and eaves-side flanges 219, on the one hand, and the longitudinal bars 112, on the other hand, by tightening bolts 222 (see FIG. 27).

Figure 29:
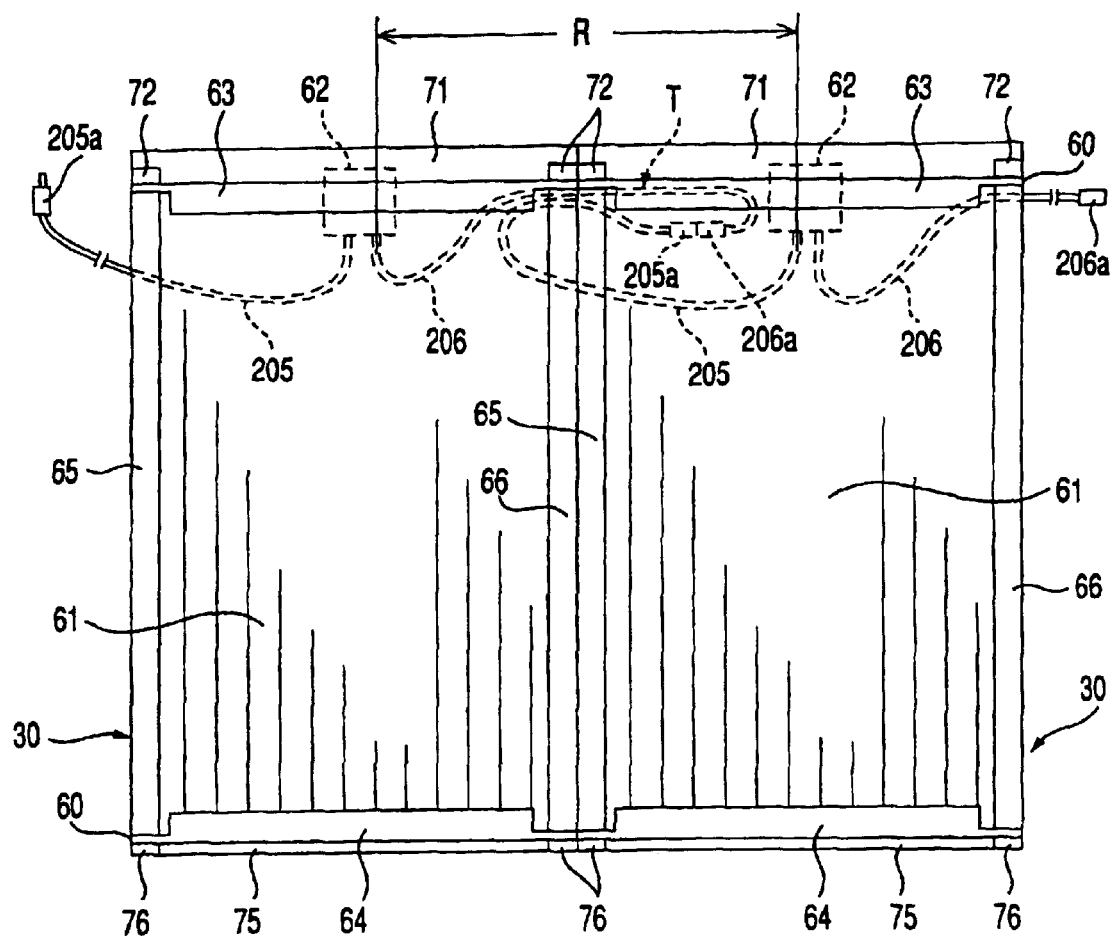
FIG. 29 is a plan view displaying the electrical connection between two adjacent photovoltaic modules in the solar-power generating apparatus illustrated in FIG. 26.

The module body 61 of each photovoltaic module 30 is a rectangular plate as illustrated in FIGS. 29 and 30A. The ratio of either long side to either short side is 2:1. A terminal box 62 is provided on the back of the photovoltaic module 30 and located close to the upper bar 63. Two output cables 205 and 206, i.e., positive cable and negative cable, are led from the terminal box 62. As best shown in FIG. 30B, a frame part 200 extends from one lateral edge of either side bar (65, 66) of the module body 61. The frame part 200 opposes the back 61a of the module body 61.

The output cables 205 and 206 are long enough to connect two adjacent photovoltaic modules 30. The output cables 205 and 206 have connectors 205a and 206a, respectively, at distal end. The connectors 205a and 206a are thicker than the insulating sheaths of the cables 205 and 206. The connectors 205a and 206a are provided at the positive-pole side and the negative-pole side, respectively. They can be connected both mechanically and electrically, by fitting one into the other. The photovoltaic modules 30 electrically connected in series generate electric power, which is supplied to the building through sheathed cables that are connected to the output cables 205 and 206 of each photovoltaic module 30.

As shown in FIG. 30C etc., each of the cable-holding members 250 is a thin metal strip bent in the form of S, as viewed from one side. Thus bent, the cable-holding member 250 defines a cable-holding groove 251 and a holding groove 252. The grooves 251 and 252 open to the opposite directions.

More specifically, the cable-holding member 250 consists of a middle part 250a and two clamping parts 250b and 250c. The cable-holding groove 251 lies between the middle part 250a and the first clamping part 250b that is bent, extending from one end of the middle part 250a The holding groove 252 lies between the middle part 250a and the second clamping part 250c that is bent, extending from the other end of the middle part 250a. The first and second clamping parts 250b and 250c are bent to the opposite directions.

The cable-holding groove 251 has a depth that is at least twice the diameter of the output cables 205 and 206. Until the cables 205 and 206 are held in the cable-holding groove 251, the opening of the groove 251 has a width X that is smaller than the diameter of the insulating sheaths of the output cables 205 and 206. The distal edge of the clamping part 250b inclines away from the opening of the cable-holding groove 251, serving as a guide. The holding groove 252 is narrower than the cable-holding groove 251. It is desired that the holding groove 252 be as deep as the cable-holding groove 251. Nonetheless, the groove 252 need not be so. Until the frame part 200 is fitted into the holding groove 252, the opening of the groove 252 remains narrower than the frame part 200 is thick. The distal edge of the clamping part 250c inclines away from the opening of the holding groove 152, serving as a guide.

The cable-holding member 250 is provisionally held on the back of the photovoltaic module 30 until the photovoltaic module 30 is brought to the site where the solar-power generating apparatus 25 is installed. The provisional holding of the member 250 is achieved by the frame part 200 of one of the side bars 66 and 66, for example, the side bar 252, into the holding groove 252, such that the frame part 200 may be removed from the groove 252. The member 250 remains so held by virtue of the elastic force of the clamping part 250c. Hence, the cable-holding member 250 can leave the frame part 200 when it is pulled away from the member 200 with a force overcoming the elastic force of the clamping part 250c, without using any tools at all.

As FIG. 30A and FIG. 30C show, the output cables 205 and 206 led from the terminal box 62 can have their middle parts removably fitted in the cable-holding groove 251 of the cable-holding member 250 that is provisionally held to the frame part 200. Since the output cables 205 and 206 are so supported, their distal ends can be held in the cable-holding groove 212 and prevented from swaying. It is unnecessary to use dedicated, cable-holding members, such as adhesive tape, to hold the two output cables 205 and 206 on the back of the photovoltaic module 30. The cable-holding groove 212 is provided between the frame part 200 and the back 61a of the module body 61.

To install the solar-power generating apparatus 25 on the roof 21, the photovoltaic modules 30 are brought onto the roof 21. Each module 30 is laid between two adjacent transverse bars spaced part in the direction the roof 21 slopes. One of these transverse bars serves as a ridge-side support member, and the other transverse bar is arranged below the transverse bar and serves as an eaves-side support member. The ends of the module 30, thus laid, are fitted into the transverse bars in the same way as has been described in connection with the second embodiment.

Each photovoltaic module 30 is brought onto the roof 21, with the distal ends of the output cables 205 and 206, i.e., positive cable and negative cable, held by the cable-holding member 250. Thus, the output cables 205 and 206 are brought up onto the roof 21, without fail.

The photovoltaic modules 30 of each group are electrically connected in series, forming a group. Therefore, the number of the cable-holding members 250 required for the group is one less than the number of the photovoltaic modules forming the group. As specified above, the photovoltaic modules are transported to the construction site, each with one cable-holding member 250 provisionally held to it. It follows that one spare cable-holding member 250 is available for each group of photovoltaic modules.

The installation of the solar-power generating apparatus 25 would not be interrupted even if the number of the cable-holding members 250 available is one less than necessary. Even if the photovoltaic modules 30 are erroneously handled and the cable-holding member 250 falls from one of the modules 30, the installation of the apparatus 25 can keep going by using the spare cable-holding member 250.

The cable-holding member 250 provided on each photovoltaic module 30 prevents the output cables 205 and 206 from swaying, before the photovoltaic module 30 is transported to the construction site. Therefore, neither the output cable 205 nor the output cable 206 will hang down when the photovoltaic module 30 is handled on the roof 21, hindering the work. The module 30 can be handled with ease. The cable-holding member 250 that prevents the output cables 205 and 206 from moving is utilized to form a cable assembly T, which will be described later. The members 250 are not through-away members. No labor is required to remove the cable-holding member 250 to facilitate the installation of the solar-power generating apparatus 25.

FIG. 29 illustrates the state of electrical connection between two photovoltaic modules 30 arranged adjacent in the transverse direction of the roof 21. The positive output cable 205 led from the back of one photovoltaic module 30 is connected in series to the negative output cable 206 led from the back of the other photovoltaic module 30. More precisely, the connector 205a on the distal end of the cable 205 is fitted into the connector 206a provided on the distal end of the cable 206. The output cables 205 and 206 thus connected shall be referred to as "cable assembly T." The output cables 205 and 206 are much longer than the width of the photovoltaic modules 30. The cable assembly T is, therefore, longer than the distance R (FIG. 29) between the points where the output cables 205 and 206 are fastened to the two photovoltaic modules 30, respectively.

This is why the cable-holding member 250 is used, as will be explained below, to prevent the cable assembly T from hanging down.

First, the cable-holding member 250 provisionally held to the frame part 200 of one photovoltaic module 30 is removed from the frame part 200. The output cables 205 and 206 are removed from the cable-holding groove 251. Then, the cables 205 and 206 are connected together, forming a cable assembly T. The photovoltaic modules 30 adjacent in the transverse direction of the roof 21 are thereby connected electrically.

Before or after the cable assembly T is formed, the cable-holding member 250 is secured to the upright edge part 219b of the eaves-side flange 219 of the ridge-side support member. The strip 250 is so secured by pushing the cable-holding member 250 down until the upright edge part 219b is fitted into the holding groove 252 that is kept positioned in the cable-holding groove 221. The clamping part 250c clamps the upright edge part 219b as it elastically deforms. It is desirable to secure the member 250 at the position where it is concealed by the adjacent photovoltaic module 30 laid on the left as shown in FIG. 29.

Figure 28:
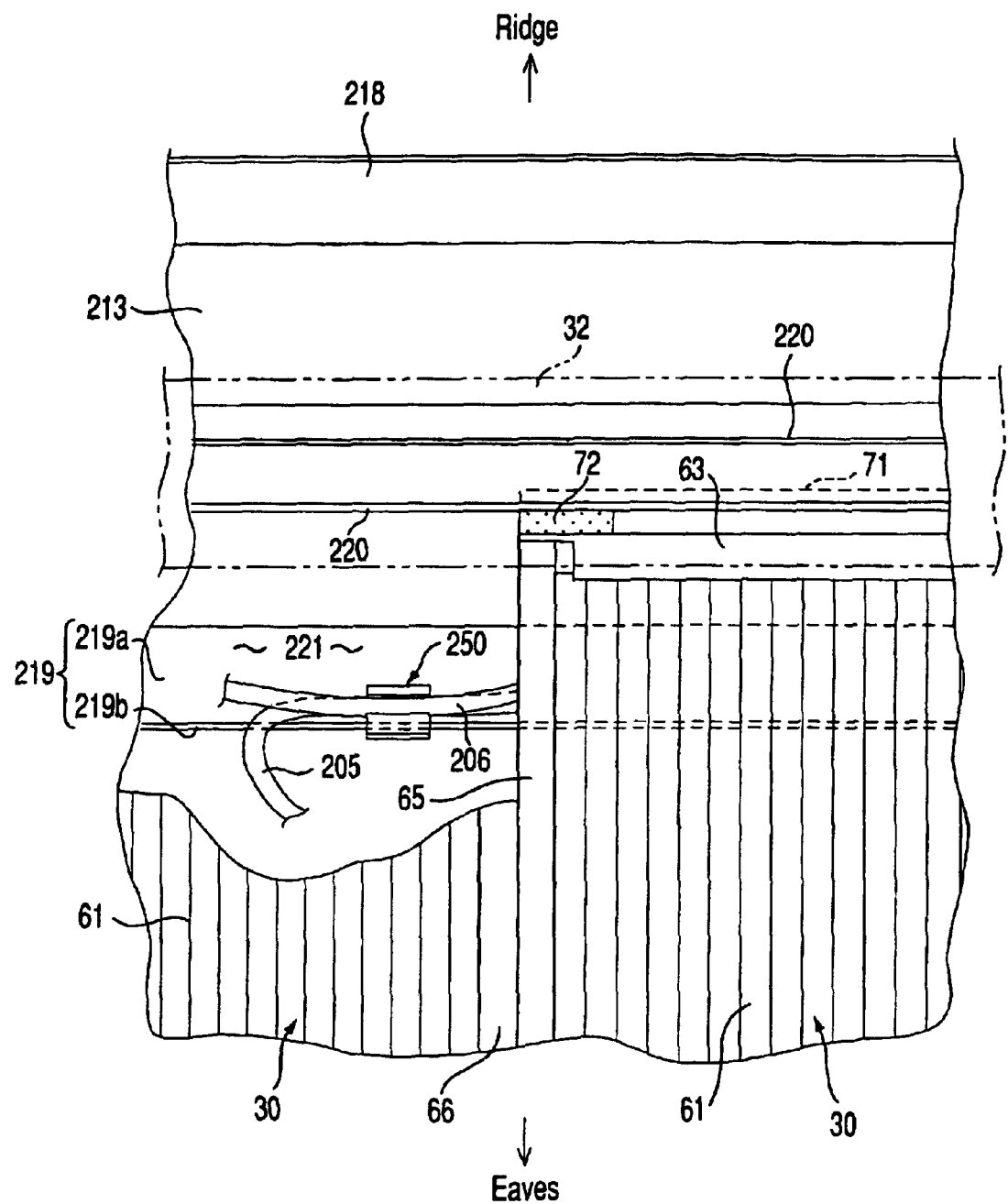
FIG. 28 is a partly cross-sectional, plan view showing a part of the solar-power generating apparatus of FIG. 26, to which a holding member has yet to be attached.

Next, the cable assembly T is bent so that the distance between its ends becomes equal to the distance R between the points where the output cables are led from the adjacent photovoltaic modules 30. At the same time, the output cables 205 and 206 are fitted into the cable-holding groove 251. The cable assembly T, or the cables bundled together, is held in the cable-holding groove 221. FIGS. 27 and 28 illustrate this condition. The cable assembly T is so held, when the output cables 205 and 206 are only pushed, from above, into the cable-holding groove 251 that opens upwards. The cable assembly T is thus fitted into the cable-holding groove 251, making use of the elastic deformation of the clamping part 250b.

Once the sequence of steps, described above, is carried out, the cable-holding member 250 can reliably hold the cable assembly T, or two cables bundled together, preventing the excessive part thereof from hanging down.

Figure 31:
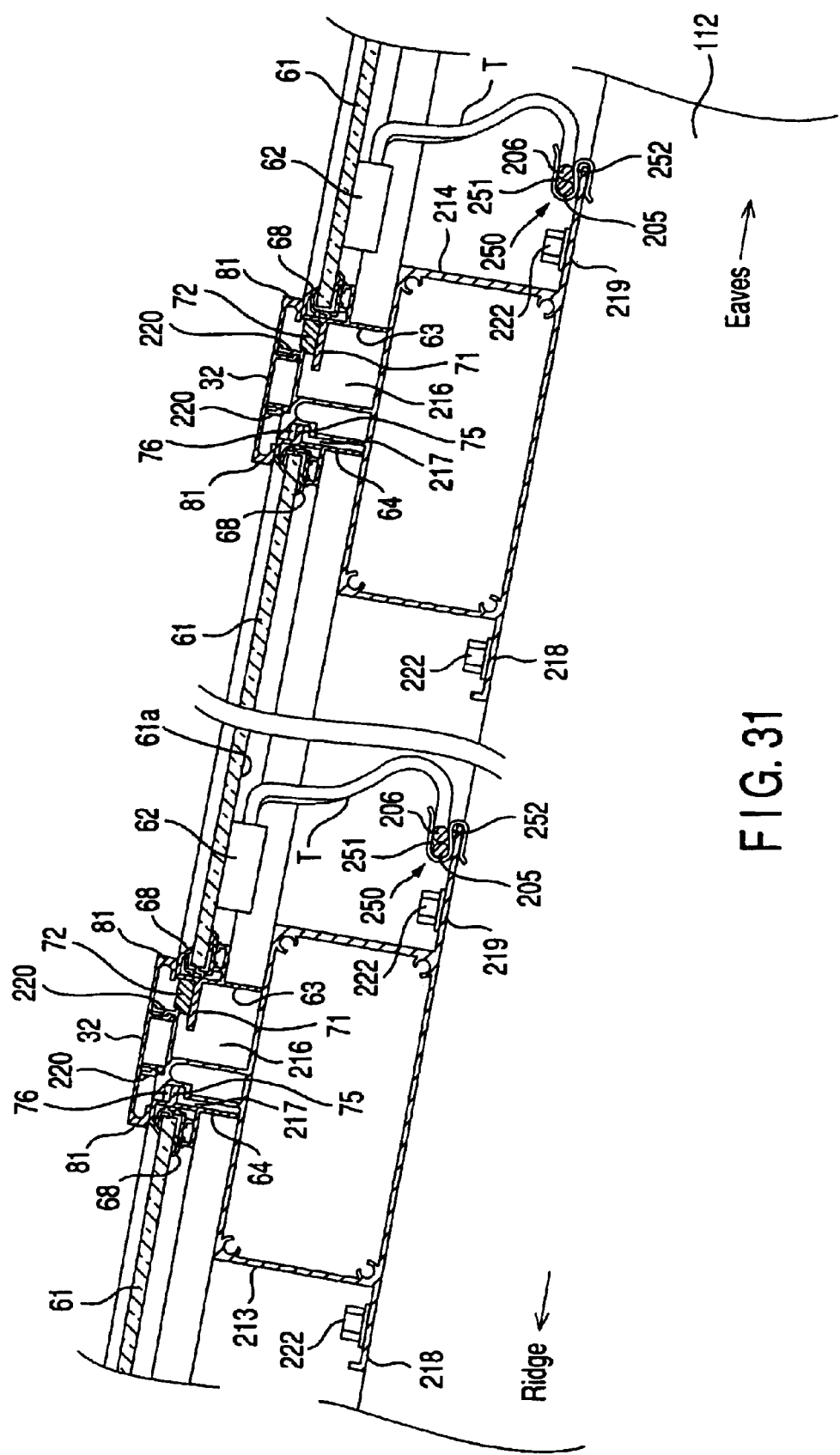
FIG. 31 is a cross-sectional view showing a solar-power generating apparatus according to an eighth embodiment of the present invention.

FIG. 31 shows the eight embodiment of the present invention. The eighth embodiment is basically the same as the seventh embodiment. The components identical or similar to those of the seventh embodiment will be designated at the same reference numerals and will not be described. The features that distinguish the eighth embodiment from the seventh embodiment will be explained. The eighth embodiment differs from the seventh embodiment in the structure of the eaves-side flange of each ridge-side support member.

To be more specific, the eaves-side flange 219 is merely a flat plate. The cable-holding member 250 is mounted on the lateral edge of the flange 219, clamping this edge, as is illustrated in FIG. 31. As long as the flange 219 remains clamped at its lateral edge, the cable-holding groove 251 of the member 250 opens toward the eaves of the roof. Thus, the cable assembly T is fitted in the cable-holding groove 251, pushed from the eaves side of the cable-holding groove 251 onto the ridge side thereof. The eighth embodiment is identical to the seventh embodiment, in all other structural aspects including those not shown in FIG. 31.

The present invention is not limited to the embodiments that have been descried. The output cables 205 and 206 may be led from the lower side of each photovoltaic module. In this case, the cable-holding member 250 is mounted on the eaves-side flange of the support member, thereby holding the cable assembly T. Further, the clamping part 250b of the cable-holding member 250 may have a cutout that projects slantwise to the middle part 250a of the member 250. The cutout may bite, at its distal end, into the flange 218 or 219 of the support member. Since the cutout bites into the flange 218 or 29, the cable-holding member 250 is more reliably secured to the flange 218 or 219 than otherwise.

In any embodiment described above, the module body 61 of each photovoltaic module 30 may be a photo-electromotive element that performs photo-electric conversion. The photo-electromotive element may be an amorphous one having has an amorphous semiconductor part, a crystalline one having a single-crystal or polycrystalline semiconductor part, or a tandem-structured one.

As has been described, the present invention is useful in the field of photovoltaic modules that convert solar energy to electric energy, in the field of solar-power generating apparatuses, each installed on roofs and generating electric power from the solar energy, in the field of support member that support photovoltaic modules. The invention is useful also in the field of methods of installing a solar-power generating apparatus.

What is claimed is:

1. A photovoltaic module having to be secured between an upper support member and a lower support member, the upper support member having an upper groove-wall and a lower groove-wall which define a down-open groove opening downward and slantwise, and the lower support member arranged below the upper support member, spaced from the upper support member and having an upper groove-wall and a lower groove-wall which define an up-open groove opening upwards and slantwise, said photovoltaic module comprising:
   a rectangular module body; and
   a frame secured to the sides of the module body and composed of an upper bar, a lower bar and a pair of side bars, the upper bar held by the upper groove-wall of the down-open groove and having an insertion projection protruding from a part of the upper bar, which is middle in the thickness direction of the upper bar, and the lower bar is inserted in the up-open groove.

2. A photovoltaic module having to be secured between an upper support member and a lower support member, the upper support member having an upper groove-wall and a lower groove-wall which define a down-open groove opening downward and slantwise, and the lower support member arranged below the upper support member, spaced from the upper support member and having an upper groove-wall and a lower groove-wall which define an up-open groove opening upwards and slantwise, said photovoltaic module comprising:
   a rectangular module body; and
   a frame secured to the sides of the module body and composed of an upper bar, a lower bar and a pair of side bars, the upper bar held by the upper groove-wall of the down-open groove and having an insertion projection protruding from a part of the upper bar, which is above that part of the upper bar, which is middle in the thickness direction of the upper bar, and the lower bar is inserted in the up-open groove.

3. The photovoltaic module according to claim 1, wherein the lower bar has an insertion projection protruding from a part of the lower bar, which is middle in the thickness direction of the lower bar, held by the upper groove-wall of the up-open groove and having a width smaller than the width of the insertion portion of the upper bar.

4. The photovoltaic module according to claim 1, wherein spacers made of buffering material are attached to the outer sides of at least one of the side bars.

5. The photovoltaic module according to claim 4, wherein the spacers are attached to the ends of said at least one side bar, respectively.

6. A solar-power generating apparatus to be installed on the roof of a building, which performs solar power generation, comprising:

an upper support member secured on the roof and having an upper groove-wall and a lower groove-wall defining a down-open groove which opens downward and slantwise;

a lower support member secured on the roof, having an upper groove-wall and a lower groove-wall defining an up-open groove which opens upwards and slantwise, arranged below the upper support member and extending parallel to the upper support member;

a plurality of photovoltaic modules, each comprising a rectangular module body and a frame secured to the sides of the module body and composed of an upper bar, a lower bar and a pair of side bars, the upper bar held by the upper groove-wall of the down-open groove and having an insertion projection protruding from a part of the upper bar, which is middle in the thickness direction of the upper bar, and the lower bar is inserted in the up-open groove.

7. The solar-power generating apparatus according to claim 6, wherein the lower bar has an insertion projection protruding from a part of the lower bar, which is middle in the thickness direction of the lower bar, held by the upper groove-wall of the up-open groove and having a width smaller than the width of the insertion portion of the upper bar.

8. The solar-power generating apparatus according to claim 6, wherein a holding member is secured to the upper support member and holds the upper bar from above in the thickness direction of the upper bar, and a holding member is secured to the lower support member and holds the lower bar from above in the thickness direction of the lower bar.

9. The solar-power generating apparatus according to claim 8, wherein the upper and lower support members have a plurality of claw-holding parts, and the holding members have a plurality of engagement claws held in the claw-holding parts.

10. The solar-power generating apparatus according to claim 7, wherein the lower groove-wall defining the up-open groove projects such that a distance between the bottoms of the down-open groove and up-open groove is shorter than a distance between the tip of the insertion projection of the upper bar and a root of the insertion projection of the lower bar.

11. The solar-power generating apparatus according to claim 6, wherein the side bars are made of metal, an electric wire having a male connection terminal is connected to one of the side bars, and an electric wire having a female connection terminal is connected to the other of the side bars.

12. The solar-power generating apparatus according to claim 11, wherein the side bars are positioned symmetrical with respect to a point, and the electric wires connected to the side bars are positioned symmetrical with respect to the point.

13. The solar-power generating apparatus according to claim 6, wherein the upper .support member has a flange extending in the lengthwise direction of the upper support member; a cable-holding member having a cable-holding groove and a holding groove for holding the flange is secured to the flange, with the flange removably fitted in the holding groove, and each of the photovoltaic modules has two output cables removably held in the cable-holding groove and bundled together therein.

14. The solar-power generating apparatus according to claim 13, wherein the side bars have a frame part each, which is removably fitted in the holding groove of the cable-holding member.

15. A support member to be secured to the roof of a building and designed to support a photovoltaic module installed on the roof, comprising:

an upper groove-wall and a lower groove-wall defining a down-open groove opening downwards and slantwise and having a closed bottom; and an upper groove-wall and a lower groove-wall defining an up-open groove, positioned back-to-back with respect to the down-open groove, opening upwards and slantwise and having a closed bottom, wherein the down-open groove is deeper than up-open groove.

16. The support member according to claim 15, wherein the distance between the upper and lower groove-walls defining the down-open groove is shorter than the thickness of the photovoltaic module, and the upper groove-wall defining the down-open groove has a width smaller than the width of the lower groove-wall defining the down-open groove.

17. A method of installing on the roof of a building a solar-power generating apparatus for performing solar power generation, said method comprising the steps of:

securing an upper support member and a lower support member on the roof, the upper support member having an upper groove-wall and a lower groove-wall defining a down-open groove which opens downward and slantwise, and the lower support member having an upper groove-wall and a lower groove-wall defining an up-open groove which opens upwards and slantwise, arranged below the upper support member and spaced from the upper support member;

moving a photovoltaic module comprising a rectangular module body and a frame secured to the sides of the module body and composed of an upper bar, a lower bar and a pair of side bars, until an insertion projection protruding from a part of the upper bar is inserted from below into the down-open groove, said part of the upper bar being middle in the thickness direction of the upper bar;

rotating the photovoltaic module around the upper bar, thereby moving the lower bar toward the lower support member and causing the lower bar to oppose the up-open groove;

moving the photovoltaic module downwards and slantwise, while holding the insertion projection in the down-open groove, thereby inserting the lower bar into the up-open groove; and securing a holding member to the upper support member, thereby holding the upper bar from above in the thickness direction of the upper bar, and securing a holding member to the lower support member, thereby holding the lower bar from above in the thickness direction of the lower bar.

18. A solar-power generating apparatus having a plurality of photovoltaic modules, said apparatus comprising:

a plurality of support bases arranged parallel to one another, each having an upper wall, an opening made in the upper wall and extending in the lengthwise direction and a groove provided inside the opening, having a bottom broader than the opening and extending in the lengthwise direction;

a plurality of support members supporting the photovoltaic modules, extending parallel to each other, and arranged on and intersecting with the support bases, each having connection holes at the intersections with the support bases;

bolt-holding bodies, each having at least one screw hole, so formed not to rotate in the grooves, and so provided movably in the grooves as to pass under the support members; and bolts driven into the screw holes through the connection holes, from above at the intersections, thereby to couple the support members to the support bases.

19. The solar-power generating apparatus according to claim 18, wherein the connection holes are elongated holes that extend in the lengthwise direction of the support members.

20. The solar-power generating apparatus according to claim 18, the bolt-holding bodies comprising a polygonal nut and a having a screw hole and a projection, the polygonal nut has a screw hole, and the projection has one end secured to the nut and the other end protruding from the opening and serving as an upright edge that can contact the support member.

* * * * *